US008928736B2

(12) United States Patent
Nakajima et al.

(10) Patent No.: US 8,928,736 B2
(45) Date of Patent: Jan. 6, 2015

(54) THREE-DIMENSIONAL MODELING APPARATUS, THREE-DIMENSIONAL MODELING METHOD AND COMPUTER-READABLE RECORDING MEDIUM STORING THREE-DIMENSIONAL MODELING PROGRAM

(75) Inventors: Mitsuyasu Nakajima, Mizuho-machi (JP); Takashi Yamaya, Fussa (JP)

(73) Assignee: Casio Computer Co., Ltd., Tokyo (JP)

( * ) Notice: Subject to any disclaimer, the term of this patent is extended or adjusted under 35 U.S.C. 154(b) by 477 days.

(21) Appl. No.: 13/440,909

(22) Filed: Apr. 5, 2012

(65) Prior Publication Data

US 2012/0257016 A1 Oct. 11, 2012

(30) Foreign Application Priority Data

Jun. 4, 2011 (JP) ................................ 2011-084881

(51) Int. Cl.
*H04N 13/02* (2006.01)
*G06T 7/00* (2006.01)
*G06T 17/20* (2006.01)
(52) U.S. Cl.
CPC ............... *G06T 7/0075* (2013.01); *G06T 17/20* (2013.01); *G06T 2200/08* (2013.01)
USPC .......................................................... 348/46
(58) Field of Classification Search
CPC .... G06T 17/20; G06T 7/0075; G06T 2200/08
See application file for complete search history.

(56) References Cited

U.S. PATENT DOCUMENTS

2002/0167726 A1* 11/2002 Barman et al. ................ 359/458
2002/0191862 A1* 12/2002 Neumann et al. ............. 382/284
(Continued)

FOREIGN PATENT DOCUMENTS

JP 10-048008 A 2/1998
JP 2953154 B2 9/1999
(Continued)

OTHER PUBLICATIONS

Japanese Office Action dated Nov. 27, 2012 (and English translation thereof) in counterpart Japanese Application No. 2012-197575, which is a Divisional Application of counterpart foreign priority Japanese Application No. 2011-084881.

(Continued)

*Primary Examiner* — Sath V Perungavoor
*Assistant Examiner* — Peter D Le
(74) *Attorney, Agent, or Firm* — Holtz, Holtz, Goodman & Chick PC

(57) ABSTRACT

In three-dimensional modeling apparatus, an image obtaining section obtains image sets picked up by stereoscopic camera. A generating section generates three-dimensional models. A three-dimensional model selecting section selects a first three-dimensional model and a second three-dimensional model to be superimposed on the first three-dimensional model among generated three-dimensional models. A extracting section extracts first and second feature points from the selected first and second three-dimensional model. A feature-point selecting section selects feature points having a closer distance to stereoscopic camera from the extracted first and second feature points. A parameter obtaining section obtains a transformation parameter for transforming a coordinate of the second three-dimensional model into a coordinate system of the first three-dimensional model. A transforming section transforms the coordinate of the second three-dimensional model into the coordinate system of the first three-dimensional model. And a superimposing section superimposes the second three-dimensional model on the first three-dimensional model.

7 Claims, 12 Drawing Sheets

(56) References Cited

U.S. PATENT DOCUMENTS

| | | | |
|---|---|---|---|
| 2003/0210407 A1* | 11/2003 | Xu | 356/611 |
| 2004/0247174 A1* | 12/2004 | Lyons et al. | 382/154 |
| 2005/0002559 A1* | 1/2005 | Terauchi et al. | 382/154 |
| 2005/0008220 A1* | 1/2005 | Miyazaki | 382/154 |
| 2005/0128196 A1* | 6/2005 | Popescu et al. | 345/420 |
| 2005/0286767 A1* | 12/2005 | Hager et al. | 382/190 |
| 2006/0029272 A1* | 2/2006 | Ogawa | 382/154 |
| 2006/0050338 A1* | 3/2006 | Hattori | 359/9 |
| 2006/0125920 A1* | 6/2006 | Criminisi et al. | 348/159 |
| 2006/0221072 A1* | 10/2006 | Se et al. | 345/420 |
| 2006/0233423 A1* | 10/2006 | Najafi et al. | 382/103 |
| 2007/0110298 A1* | 5/2007 | Graepel et al. | 382/154 |
| 2007/0177818 A1 | 8/2007 | Teshima et al. | |
| 2007/0296721 A1* | 12/2007 | Chang et al. | 345/427 |
| 2008/0187175 A1* | 8/2008 | Kim et al. | 382/103 |
| 2009/0262113 A1* | 10/2009 | Kotake et al. | 345/427 |
| 2009/0304264 A1* | 12/2009 | Au et al. | 382/154 |

FOREIGN PATENT DOCUMENTS

| | | |
|---|---|---|
| JP | 2005-332177 A | 12/2005 |
| JP | 2007-108043 A | 4/2007 |
| JP | 2007-201948 A | 8/2007 |

OTHER PUBLICATIONS

Yoshiya Kowashi et al.: "A Study on Construction of Fine Three-Dimensional Shape by Images of Close Shot and Far Shot": Proceedings of the Institute of Electronics, Information and Communication Engineers General Conference, 2006: Information and System (2), the Institute of Electronics, Information and Communication Engineers: Mar. 8, 2006: p. 188.

Japanese Office Action dated Jul. 17, 2012 and English translation thereof in counterpart Japanese Application No. 2011-084881.

"Digital Image Processing", Yoichi Sato et al., edited by Digital Image Processing Editorial Committee, Published by Computer Graphic Arts (CG-Arts) Society First Edition: Jul. 22, 2004, Second Edition (Second copy): Mar. 2, 2009; pp. 252-262.

English language translation of "Digital Image Processing", Yoichi Sato et al., edited by Digital Image Processing Editorial Committee, Published by Computer Graphic Arts (CG-Arts) Society First Edition: Jul. 22, 2004, Second Edition (Second copy): Mar. 2, 2009; pp. 252-262.

* cited by examiner

THREE-DIMENSIONAL MODELING APPARATUS, THREE-DIMENSIONAL MODELING METHOD AND COMPUTER-READABLE RECORDING MEDIUM STORING THREE-DIMENSIONAL MODELING PROGRAM

CROSS-REFERENCE TO RELATED APPLICATION

This application claims the benefit of Japanese Patent Application No. 2011-084881, filed on Apr. 6, 2011, the entire disclosure of which is incorporated by reference herein.

FIELD

This application relates generally to a three-dimensional modeling apparatus, a three-dimensional modeling method, and a computer-readable recording medium storing a three-dimensional modeling program for appropriately performing three-dimensional modeling on an object.

BACKGROUND

There is a known technique for picking up images of an object like an art object through a stereoscopic camera having an image-pickup unit for a right eye and an image-pickup unit for a left eye, and generating a three-dimensional model of the object based on a right-eye image and a left-eye image (stereoscopic images) obtained by the image pickup.

Moreover, there is another known technique for generating a plurality of three-dimensional models from a plurality of stereoscopic images picked up at different positions, and generating a three-dimensional model with a higher precision by synthesizing the plurality of generated three-dimensional models.

Furthermore, the other technique is known for moving a monocular camera so as to obtain parallel stereoscopic images before and after the movement and generating a three-dimensional image of an object having undergone an image-pickup using two images picked up by the monocular camera before and after the movement.

SUMMARY

A first aspect of the present invention provides a three-dimensional modeling apparatus comprising: an image obtaining section that obtains image sets picked up by a stereoscopic camera; a generating section that generates three-dimensional models of an object based on each of the obtained image sets; a three-dimensional model selecting section that selects a first three-dimensional model and a second three-dimensional model to be superimposed on the first three-dimensional model among the generated three-dimensional models; an extracting section which extracts first feature points from the selected first three-dimensional model and second feature points from the selected second three-dimensional model; a feature-point selecting section that selects feature points having a closer distance to the stereoscopic camera from the extracted first feature points and the extracted second feature points, respectively; a parameter obtaining section that obtains a transformation parameter for transforming a coordinate of the second three-dimensional model into a coordinate in a coordinate system of the first three-dimensional model based on the selected first and second feature points; a transforming section that transforms the coordinate of the second three-dimensional model into the coordinate in the coordinate system of the first three-dimensional model using the transformation parameter; and a superimposing section that superimposes the second three-dimensional model having a transformed coordinate on the first three-dimensional model.

A second aspect of the present invention provides a three-dimensional modeling apparatus comprising: an obtaining section that obtains a first image and a second image obtained by imaging an object at different positions; an extracting section which extracts first feature points on the first image and second feature points on the second image corresponding to the first feature points, respectively; a selecting section that selects a combination of the first feature point and the second feature point having a closer distance to a camera at a time of imaging among the first feature points and the second feature points corresponding to the first feature points; a parameter obtaining section that obtains a transformation parameter indicating a positional relationship of a position at which the first image is imaged and a position at which the second image is imaged based on the selected combination of the first and second feature points; an information obtaining section that obtains pieces of three-dimensional information of the first feature points and the second feature points extracted by the extracting section based on the transformation parameter; and a generating section that generates a three-dimensional model based on the three-dimensional information.

A third aspect of the present invention provides a three-dimensional modeling method comprising: obtaining image sets picked up by a stereoscopic camera; generating three-dimensional models of an object based on each of the obtained image sets; selecting a first three-dimensional model and a second three-dimensional model to be superimposed on the first three-dimensional model among the generated three-dimensional models; extracting first feature points from the selected first three-dimensional model and second feature points from the selected second three-dimensional model; selecting feature points having a closer distance to the stereoscopic camera from the extracted first feature points and the extracted second feature points, respectively; obtaining a transformation parameter for transforming a coordinate of the second three-dimensional model into a coordinate in a coordinate system of the first three-dimensional model based on the selected first and second feature points; transforming the coordinate of the second three-dimensional model into the coordinate in the coordinate system of the first three-dimensional model using the transformation parameter; and superimposing the second three-dimensional model having a transformed coordinate on the first three-dimensional model.

A fourth aspect of the present invention provides a three-dimensional modeling method comprising: obtaining a first image and a second image obtained by imaging an object at different positions; extracting first feature points on the first image and second feature points on the second image corresponding to the first feature points, respectively; selecting a combination of the first feature point and the second feature point having a closer distance to a camera at a time of imaging among the first feature points and the second feature points corresponding to the first feature points; obtaining a transformation parameter indicating a positional relationship of a position at which the first image is imaged and a position at which the second image is imaged based on the selected combination of the first and second feature points; obtaining pieces of three-dimensional information of the extracted first feature points and the extracted second feature points based on the transformation parameter; and generating a three-dimensional model based on the three-dimensional information.

A fifth aspect of the present invention provides a computer-readable recording medium having stored therein a program executable by a computer, the program causing the computer to realize functions of: obtaining image sets picked up by a stereoscopic camera; generating three-dimensional models of an object based on each of the obtained image sets; selecting a first three-dimensional model and a second three-dimensional model to be superimposed on the first three-dimensional model among the generated three-dimensional models; extracting first feature points from the selected first three-dimensional model and second feature points from the selected second three-dimensional model; selecting feature points having a closer distance to the stereoscopic camera from the extracted first feature points and the extracted second feature points, respectively; obtaining a transformation parameter for transforming a coordinate of the second three-dimensional model into a coordinate in a coordinate system of the first three-dimensional model based on the selected first and second feature points; transforming the coordinate of the second three-dimensional model into the coordinate in the coordinate system of the first three-dimensional model using the transformation parameter; and superimposing the second three-dimensional model having a transformed coordinate on the first three-dimensional model.

A sixth aspect of the present invention provides a computer-readable recording medium having stored therein a program executable by a computer, the program causing the computer to realize functions of: obtaining a first image and a second image obtained by imaging an object at different positions; extracting first feature points on the first image and second feature points on the second image corresponding to the first feature points, respectively; selecting a combination of the first feature point and the second feature point having a closer distance to a camera at a time of imaging among the first feature points and the second feature points corresponding to the first feature points; obtaining a transformation parameter indicating a positional relationship of a position at which the first image is imaged and a position at which the second image is imaged based on the selected combination of the first and second feature points; obtaining pieces of three-dimensional information of the extracted first feature points and the extracted second feature points based on the transformation parameter; and generating a three-dimensional model based on the three-dimensional information.

BRIEF DESCRIPTION OF THE DRAWINGS

A more complete understanding of this application can be obtained when the following detailed description is considered in conjunction with the following drawings, in which.

DETAILED DESCRIPTION

Figure 1A:
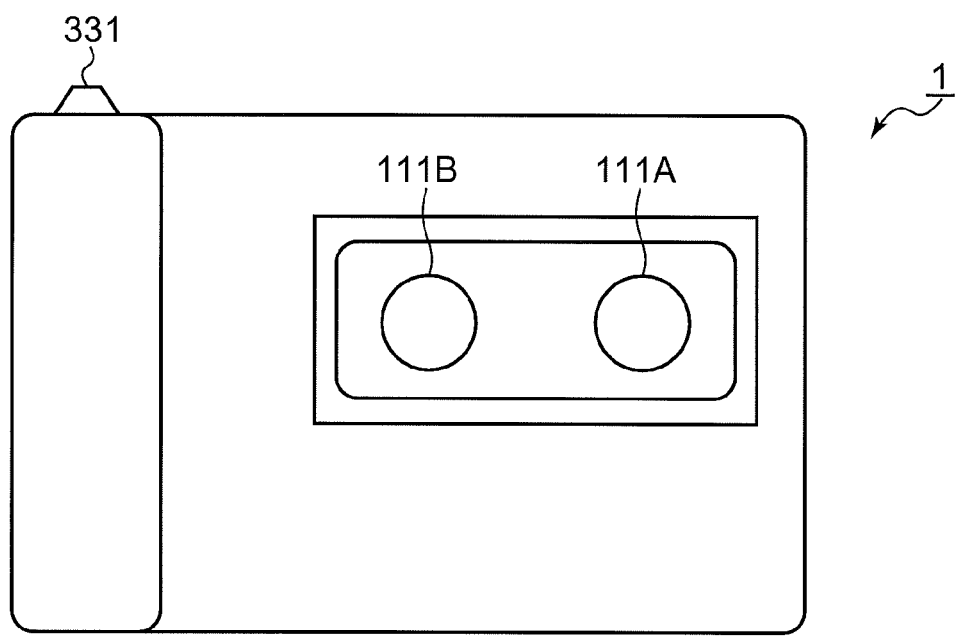
FIG. 1A is a diagram showing a front appearance of a stereoscopic camera according to a first embodiment of the present invention.

Embodiments of the present invention will be explained in detail with reference to the accompanying drawings. In the following embodiments, the explanation will be given of an example case in which the present invention is applied to a digital stereoscopic camera. However, the present invention is not limited to the following embodiments and drawings. The following embodiments and drawings can be changed and modified without departing from the scope and spirit of the present invention. The same or corresponding element in the drawings will be denoted by the same reference numeral.

<First Embodiment>

Figure 1B:
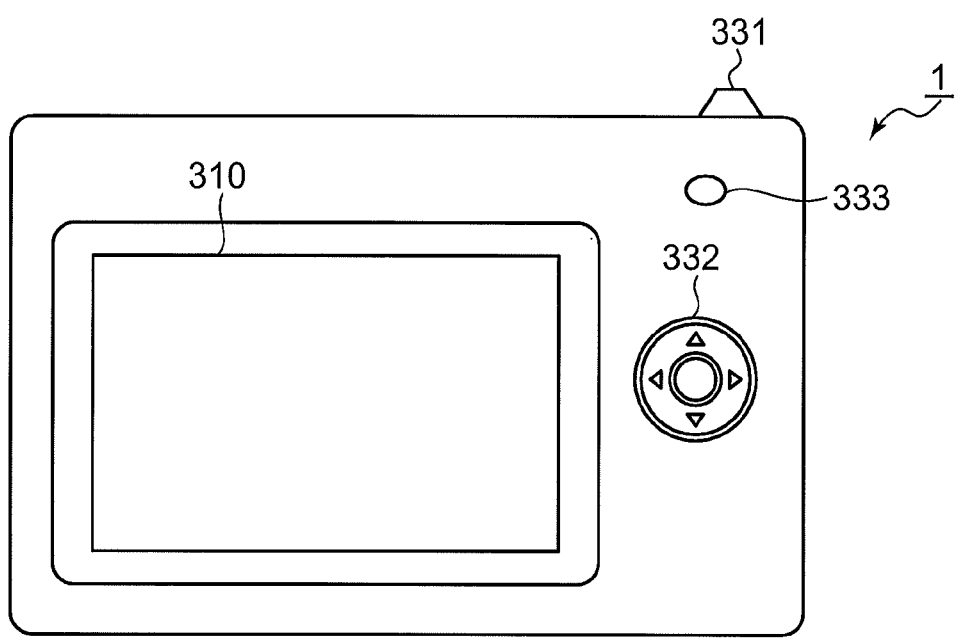
FIG. 1B is a diagram showing a back appearance of the stereoscopic camera of the first embodiment.

First of all, an explanation will be given of a first embodiment. FIGS. 1A and 1B show external appearances of a stereoscopic camera 1 according to the first embodiment. As shown in FIG. 1A, the stereoscopic camera 1 includes a lens 111A, and a lens 111B, provided at the front face of the stereoscopic camera 1, and has a shutter button 331 provided at the top face thereof. The lenses 111A and 111B are distant from each other at a predetermined clearance and disposed so as to have respective center positions located on the same line in the horizontal direction when the stereoscopic camera 1 is leveled with the shutter button 331 being in the vertical direction. The shutter button 331 is a button that receives a shutter operation instruction given by a user.

As shown in FIG. 1B, the stereoscopic camera 1 has a display 310, an operation key 332, and a power key 333 provided at the back face of the stereoscopic camera 1. The display 310 is, for example, a liquid crystal display device, and functions as an electronic view finder that displays various screens necessary to operate the stereoscopic camera 1, a live view image and a picked-up image, etc., at the time of image-pickup.

The operation key 332 includes a cross key and a set key, etc., and receives various operation given by the user, such as a mode change, and a display change. The power key 333 is a button that receives power on/off operation of the stereoscopic camera 1 given by the user.

Figure 2:
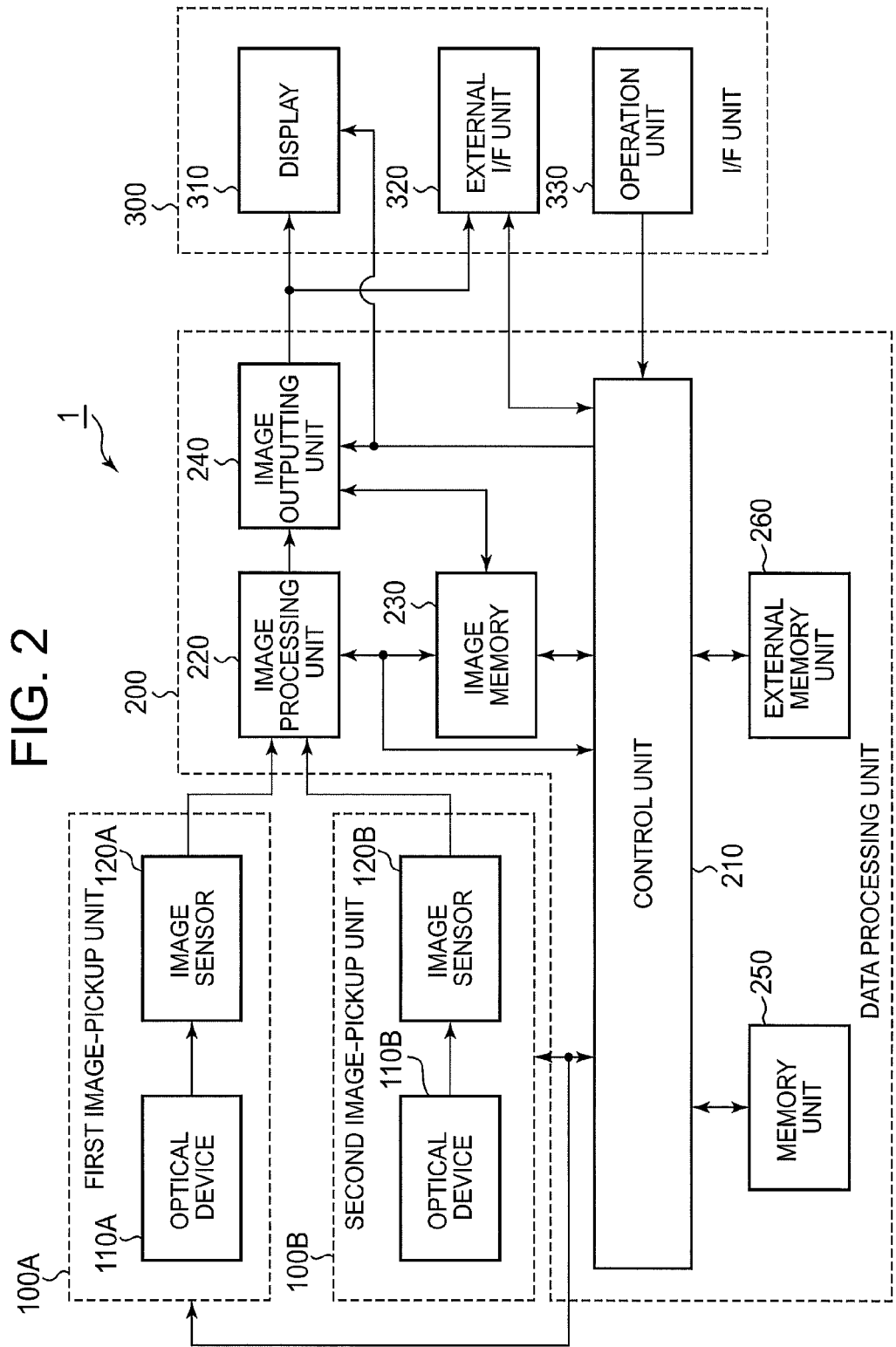
FIG. 2 is a diagram showing a configuration of the stereoscopic camera of the first embodiment.

FIG. 2 is a block diagram showing a functional configuration of the stereoscopic camera 1. As shown in FIG. 2, the stereoscopic camera 1 includes a first image-pickup unit 100A, a second image-pickup unit 100B, a data processing unit 200, and an interface unit 300. The interface unit will be indicated as I/F unit as needed in the figure.

The first and second image-pickup units 100A and 100B are units bearing a function of picking up images of an object, respectively. The stereoscopic camera 1 is a so-called binocular (multicular) camera, and has the two image-pickup units as explained above. The first and second image-pickup units 100A and 100B employ the same structure. Hereinafter, the structural element for the first image-pickup unit 100A will be denoted by a symbol "A" at the end of a reference numeral, and the structural element for the second image-pickup unit 100B will be denoted by a symbol "B" at the end of a reference numeral.

As shown in FIG. 2, the first image-pickup unit 100A (the second image-pickup unit 100B) includes an optical device 110A (110B), and an image sensor 120A (120B), etc. The optical device 110A (110B) includes, lenses, a diaphragm mechanism, and a shutter mechanism, etc., and performs optical operation relating to an image-pickup. That is, incident lights are collected through the operation of the optical device 110A (110B), and optical factors relating to a field angle, a focus, and an exposure, etc., such as a focal distance, a diaphragm, and a shutter speed, are adjusted.

The shutter mechanism included in the optical device 110A (110B) is a so-called mechanical shutter. When a shutter operation is carried out only through the operation of the image sensor, it is fine if the optical device 110A (110B) has no shutter mechanism. Moreover, the optical device 110A (110B) operates under the control of a control unit 210 to be discussed later.

The image sensor 120A (120B) generates electrical signals in accordance with incident lights collected by the optical device 110A (110B). The image sensor 120A (120B) is an image sensor, such as a CCD (Charge Coupled Device) or a CMOS (Complementary Metal Oxide Semiconductor), performs photoelectric conversion to generate electrical signals in accordance with an intensity of received light, and outputs the generated electrical signals to the data processing unit 200.

As explained above, the first and second image-pickup units 100A and 100B employ the same structure. More specifically, respective specifications, such as a focal distance f of a lens, an F value, a diaphragm range of the diaphragm mechanism, the size and number of pixels of the image sensor, the layout of pixels, and the pixel area are all same. When the first and second image-pickup units 100A and 100B are operated simultaneously, two images are picked up for the same object, but the positions of the optical axis are different in the horizontal direction.

The data processing unit 200 processes the electrical signals generated by the image-pickup operations of the first and second image-pickup units 100A and 100B, generates digital data representing a picked-up image, and performs image processing, etc., on the picked-up image. The data processing unit 200 includes the control unit 210, an image processing unit 220, an image memory 230, an image outputting unit 240, a memory unit 250, and an external memory unit 260, etc.

The control unit 210 includes a processor like a CPU (Central Processing Unit), a main memory device like a RAM (Random Access Memory), etc., and runs a program stored in the memory unit 250, etc., thereby controlling respective units of the stereoscopic camera 1. Moreover, according to this embodiment, the control unit 210 realizes functions relating to a three-dimensional modeling process, etc., to be discussed later by running a predetermined program.

The image processing unit 220 includes an ADC (Analog-Digital Converter), a buffer memory, and a processor for image processing (i.e., a so-called image processing engine), etc., and generates digital data representing a picked-up image based on electrical signals generated by the image sensors 120A and 120B. That is, when analog electrical signals output by the image sensor 120A (120B) are converted into digital signals by an ADC and successively stored in the buffer memory, the image processing engine performs a so-called image developing process on the buffered digital data, thereby, for example, adjusting the image quality and compressing the data.

The image memory 230 includes a memory device like a RAM or a flash memory, and temporally stores, for example, picked-up image data generated by the image processing unit 220 and image data processed by the control unit 210.

The image outputting unit 240 includes, for example, a circuit that generates RGB signals, transforms image data stored in the image memory 230 into RGB signals, and outputs the RGB signals to a display screen (e.g., the display 310).

The memory unit 250 includes a memory device like a ROM (Read Only Memory) or a flash memory, and stores programs, data, counters, etc., necessary for operating the stereoscopic camera 1. In this embodiment, the memory unit 250 stores an operation program run by the control unit 210, etc., and data on parameters and arithmetic expressions, etc., necessary when the operation program is run.

The external memory unit 260 is a memory device attachable to and detachable from the stereoscopic camera 1 like a memory card, and stores image data picked up by the stereoscopic camera 1, three-dimensional model data, etc.

The interface unit 300 is a processing unit that bears a function as an interface between the stereoscopic camera 1 and the user or an external device, and includes the display 310, an external interface unit 320, an operation unit 330, etc.

As explained above, the display 310 includes, for example, a liquid crystal display device, and displays and outputs various screens necessary for the user to operate the stereoscopic camera 1, a live-view image at the time of image-pickup, and a picked-up image, etc. According to this embodiment, a picked-up image, etc., is displayed and output based on an image signal (the RGB signal), etc., from the image outputting unit 240.

The external interface unit 320 includes a USB (Universal Serial Bus) connector, a video output terminal, etc., outputs image data to an external computer device, and displays and outputs a picked-up image to an external monitor device.

The operation unit 330 includes various buttons, etc., provided on the external face of the stereoscopic camera 1, generates an input signal in accordance with an operation given by the user, and transmits the input signal to the control unit 210. The buttons configuring the operation unit 330 include, as explained above, the shutter button 331, the operation key 332, the power key 333, etc.

The explanation was given of the configuration of the stereoscopic camera 1 necessary to carry out the present invention, but it is presumed that the stereoscopic camera 1 employs configurations for realizing various functions of a typical stereoscopic camera.

Next, an explanation will be given of an operation relating to three-dimensional modeling among the operations of the stereoscopic camera 1 with reference to FIG. 3.

Figure 3:
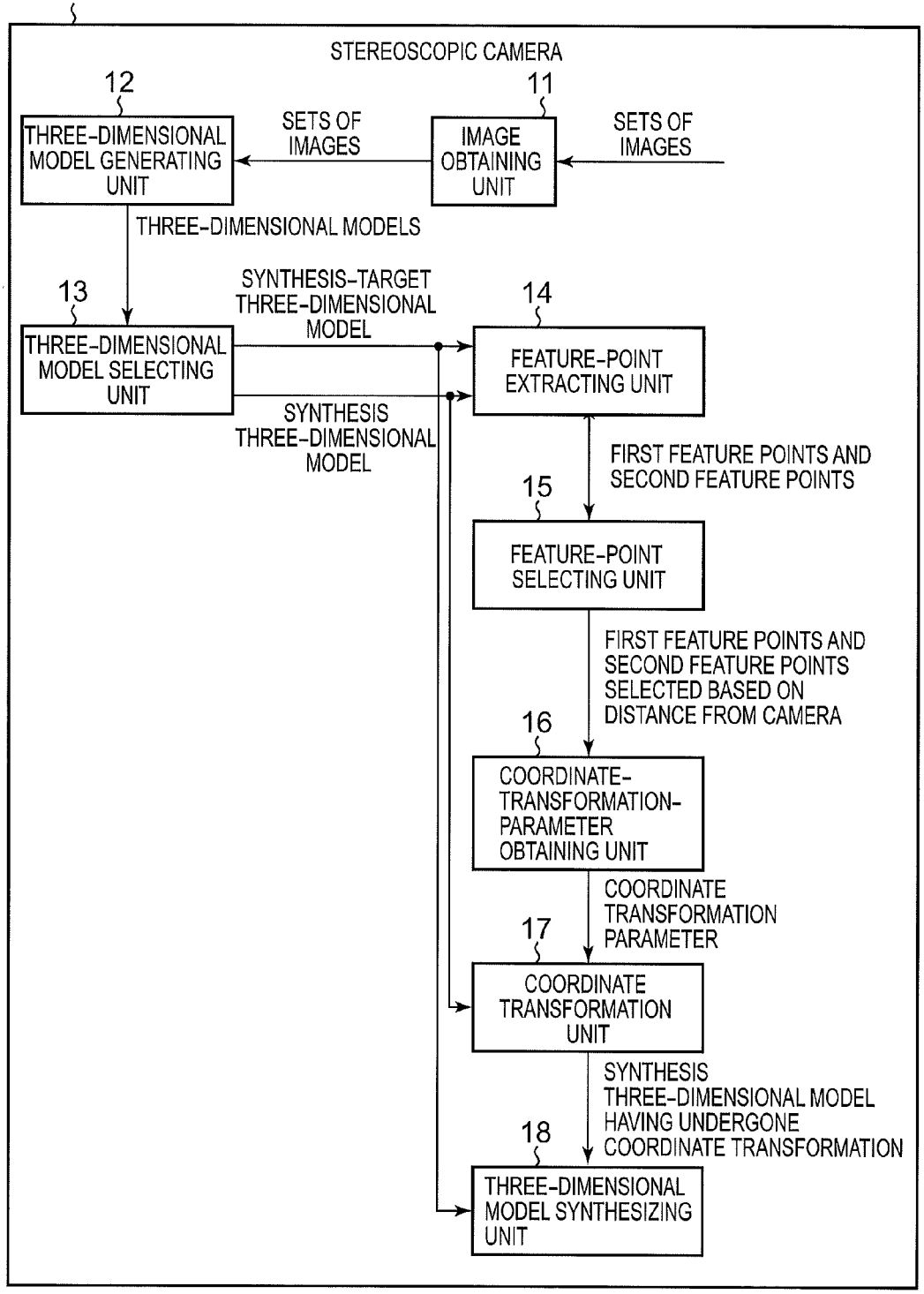
FIG. 3 is a diagram showing a configuration of the main part of the stereoscopic of the first embodiment.

FIG. 3 is a block diagram showing a configuration of a main part of the stereoscopic camera 1, i.e., a configuration for realizing the operation relating to three-dimensional modeling.

As shown in FIG. 3, the stereoscopic camera 1 includes an image obtaining unit 11, a three-dimensional model generating unit 12, a three-dimensional model selecting unit 13, a feature-point extracting unit 14, a feature-point selecting unit 15, a coordinate-transformation-parameter obtaining unit 16, a coordinate transformation unit 17, and a three-dimensional model synthesizing unit 18. Those structural elements are configured by the control unit 210, etc.

The image obtaining unit 11 obtains a plurality of sets of images obtained by multiple image-pickup operation on an object at different angles using the stereoscopic camera 1 that obtains a set of images through an image-pickup operation.

The three-dimensional model generating unit 12 generates a plurality of three-dimensional models of the object based on each of the plurality of sets of obtained images.

The three-dimensional model selecting unit 13 selects a synthesis-target three-dimensional model (a first three-dimensional model) and a synthesis three-dimensional model (a second three-dimensional model) synthesized with the synthesis-target three-dimensional model among the plurality of generated three-dimensional models.

The feature-point extracting unit 14 extracts a plurality of first feature points from the selected synthesis-target three-dimensional model, and also extracts a plurality of second feature points from the selected synthesis three-dimensional model.

The feature-point selecting unit 15 preferentially selects a feature point close to the stereoscopic camera 1 among the plurality of first and second feature points extracted.

The coordinate-transformation-parameter obtaining unit 16 obtains a coordinate transformation parameter for transforming the coordinates of the synthesis three-dimensional model into the coordinate in the coordinate system of the synthesis-target three-dimensional model based on the plurality of first and second feature points selected.

The coordinate transformation unit 17 transforms the coordinate of the synthesis three-dimensional model into the coordinate in the coordinate system of the synthesis-target three-dimensional model using the obtained coordinate transformation parameter.

The three-dimensional model synthesizing unit 18 synthesizes the synthesis three-dimensional model having undergone a transformation with the synthesis-target three-dimensional model.

Figure 4:
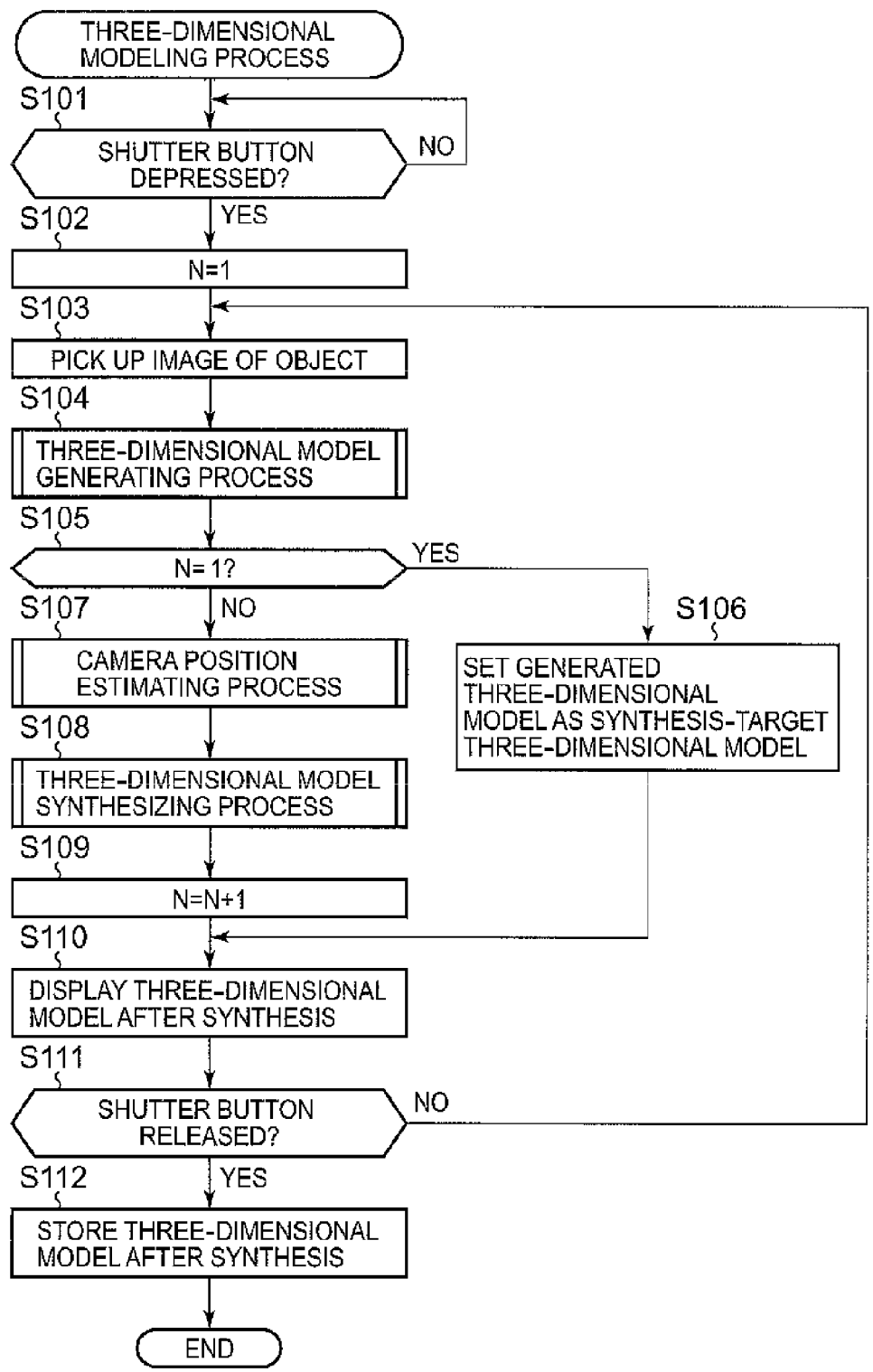
FIG. 4 is a flowchart showing a three-dimensional modeling process executed by the stereoscopic camera of the first embodiment.

Next, an explanation will be given of a three-dimensional modeling process executed by the stereoscopic camera 1 using the flowchart of FIG. 4. When the operation key 332, etc., receives an operation given by the user, and the operation mode is set to a three-dimensional modeling mode, the stereoscopic camera 1 starts executing the three-dimensional modeling process shown in FIG. 4.

In this embodiment, while the shutter button 331 is being depressed, operations, such as image-pickup of the object, generation of a three-dimensional model, synthesis of the generated three-dimensional model, and preview display of the synthesized three-dimensional model, are repeatedly executed. A three-dimensional model obtained by the first image-pickup and becomes the basis of a synthesis is referred to as the synthesis-target three-dimensional model (a first three-dimensional model). Moreover, a three-dimensional model obtained by the second or later image-pickup and is synthesized the synthesis-target three-dimensional model is referred to as the synthesis three-dimensional model (a second three-dimensional model). In the three-dimensional modeling process, three-dimensional models are successively generated which are obtained by synthesizing three-dimensional models by plural times of image-pickup. Images of the object are picked up at different angles image-pickup by image-pickup.

First, the control unit 210 determines whether or not the shutter button 331 is depressed (step S101). When determining that the shutter button 331 is not depressed (step S101: NO), the control unit 210 executes the process of the step S101 again. Conversely, when determining that the shutter button 331 is depressed (step S101: YES), the control unit 210 initializes an image-pickup time counter N to be 1 (step S102). The image-pickup time counter N is stored in, for example, the memory unit 250.

Subsequently, the control unit 210 controls the first and second image-pickup units 100A and 100B and the image processing unit 220, etc., to pick up images of the object (step S103). When the images of the object are picked up by the control unit 210, two parallel and corresponding images (pair images, also called image set) are obtained. The obtained pair images are stored in, for example, the image memory 230. The image picked up by the first image-pickup unit 100A is referred to as an image A, and the image picked up by the second image-pickup unit 100B is referred to as an image B of the pair images.

Next, the control unit 210 executes a three-dimensional model generating process based on the pair images stored in the image memory 230 (step S104).

Figure 5:
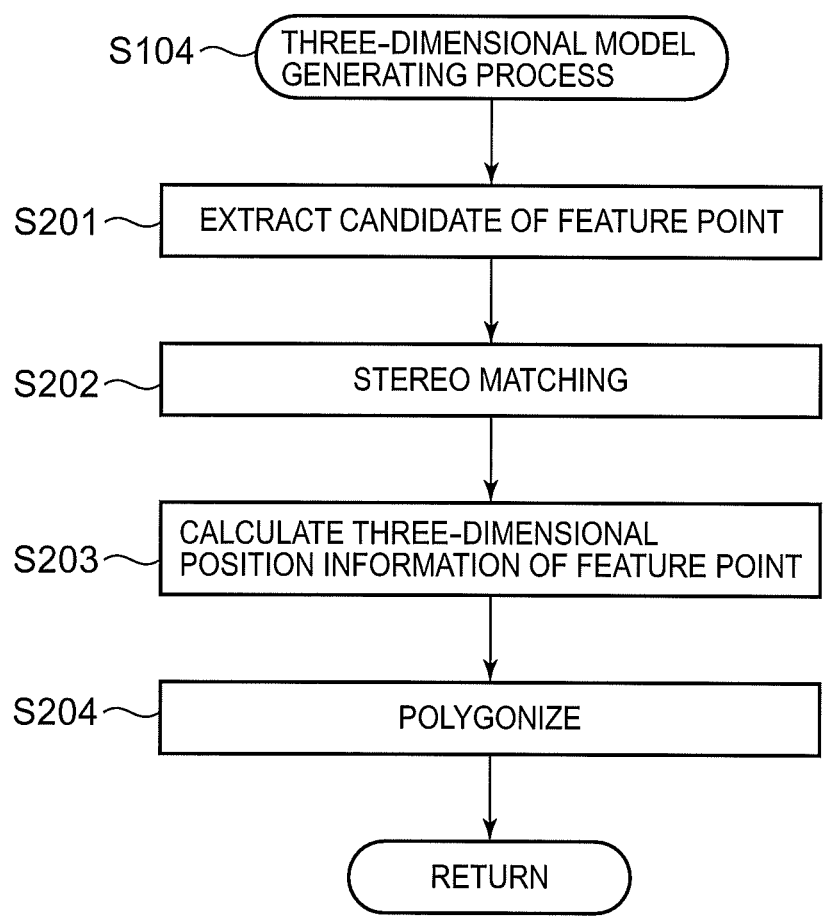
FIG. 5 is a flowchart showing a three-dimensional model generating process shown in FIG. 4.

An explanation will now be given of the three-dimensional model generating process with reference to the flowchart of FIG. 5. The three-dimensional model generating process is to generate a three-dimensional model based on a pair images. That is, the three-dimensional model generating process can be deemed as a process of generating a three-dimensional model as viewed from a camera position.

First, the control unit 210 extracts candidates of a feature point (step S201). For example, the control unit 210 performs corner detection on the image A. In the corner detection, a corner feature quantity of each point (pixel) is calculated by, for example, the Harris method. Furthermore, a point (pixel) of which the calculated corner feature quantity is equal to or greater than the predetermined threshold and has the maximum value within an area of a predetermined radius from the point is selected as a corner point. Hence, a point with a feature relative to the other points like a tip of the object is extracted as the feature point.

Subsequently, the control unit 210 performs stereo matching to find a point (a corresponding point) corresponding to the feature point in the image A from the image B (step S202). More specifically, the control unit 210 calculates a similarity for each point (pixel) in the image B through template matching. A point having the similarity equal to or larger than a predetermined threshold and maximum (i.e., the difference is equal to or smaller than a predetermined threshold and is minimum) is selected as a corresponding point. For the template matching, various conventionally well-known techniques, such as the methods using a sum of absolute differences (SAD), a sum of squared differences (SSD), a normalized correlation (such as NCC (normalized cross correlation) or ZNCC (zero-mean normalized cross correlation)), and/or an orientation code correlation, are available.

Next, the control unit 210 calculates three-dimensional position information on the feature point based on the disparity information of the corresponding point found in the step S202, respective field angles of the first and second image-pickup units 100A and 100B, and a base-line length, etc (step S203). The disparity information indicates a difference between (i) the position of the point in the image A and (ii) the position of the corresponding point in the image B. The calculated three-dimensional position information of the feature point is stored in, for example, the memory unit 250.

Next, the control unit 210 executes Delaunay triangulation based on the three-dimensional position information of the feature point calculated in the step S203, and executes polygonization (step S204). Generated polygon information (a three-dimensional model) is stored in, for example, the memory unit 250. Upon completion of the process in the step S204, the control unit 210 terminates the three-dimensional model generating process.

When the number of feature points is small, the contour information of the object lacks and thus a faithful three-dimensional model of the object cannot be obtained. Conversely, if the condition of extracting candidates of a feature point and the condition of stereo matching are eased in order to obtain a more number of feature points, the candidates of a feature point may contain inappropriate points, and a false correspondence occurs through the stereo matching. In this case, the position precision decreases, resulting in deterioration of the modeling precision. Hence, it is necessary to extract an appropriate number of feature points so as to suppress deterioration of the modeling precision and to obtain a faithful three-dimensional model of the object.

Moreover, the three-dimensional model (the three-dimensional information) is obtained from the pair images using, for example, the following three formulae. The detail of the technique of obtaining three-dimensional information from pair images is disclosed in, for example, "digital image processing", issued on Mar. 1, 2006, CG-ARTS Society.

$$X=(b*u)/(u-u')$$

$$Y=(b*v)/(u-u')$$

$$Z=(b*f)/(u-u')$$

In the formulae described above, "b" is a distance between the optical device 110A and the optical device 110B, and is often called a base-line length. "(u, v)" are coordinates of the object in the image picked up by the optical device 110A, and "(u', v')" are coordinates of the object in the image picked up by the optical device 110B. "(u-u')" in the formulae is a difference in coordinate of the object in two images when the optical devices 110A and 110B pick up images of the same object, and is called a disparity. "f" is a focal distance of the optical device 110A. As explained already, the optical devices 110A and 110B employ the same configuration and have an equal focal distance "f".

Returning to FIG. 4, when the three-dimensional model generating process (step S104) completes, the control unit 210 determines whether or not the image-pickup time counter N is 1 (step S105). When the image-pickup time counter N is 1, it means that the current situation is right after the first image-pickup. When determining that the image-pickup time counter N is 1 (step S105: YES), the control unit 210 sets the three-dimensional model generated through the process in the step S104 as the synthesis-target three-dimensional model (step S106).

Figure 6:
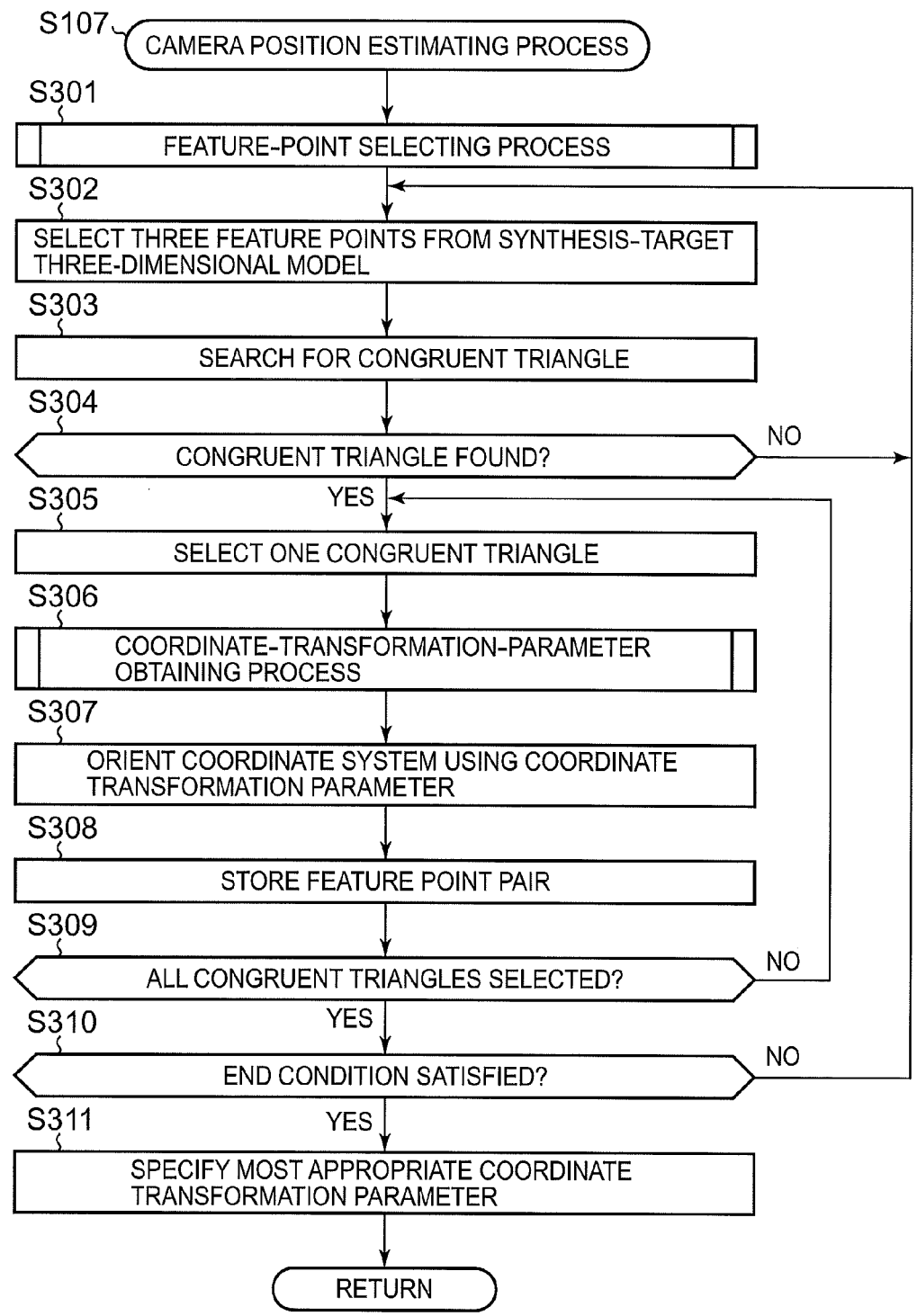
FIG. 6 is a flowchart showing a camera position estimating process shown in FIG. 4.

Conversely, when determining that the image-pickup time counter N is not 1, i.e., the current situation is not right after the first image-pickup (step S105: NO), the control unit 210 executes a camera position estimating process (step S107). The control unit 210 sets a three-dimensional model newly obtained in the step S104 of the current process loop as the synthesis three-dimensional model. An explanation will now be given of the detail of the camera position estimating process with reference to the flowchart of FIG. 6. In the camera position estimating process, a relative position of the stereoscopic camera 1 at the present image-pickup relative to the position of the stereoscopic camera 1 at the first image-pickup is obtained. Obtaining of the relative position is synonymous with obtaining of a coordinate transformation parameter that transforms the coordinates of the three-dimensional model obtained at the present image-pickup into the coordinates in the coordinate system of the three-dimensional model obtained at the first image-pickup.

First, the control unit 210 executes a feature-point selecting process of selecting a feature point on a three-dimensional space used for a calculation of a camera position (a coordinate transformation parameter) from both of the synthesis-target three-dimensional model and the synthesis three-dimensional model (step S301). The feature-point selecting process will be explained with reference to the flowchart of FIG. 7.

First, the control unit 210 obtains feature points on the three-dimensional space from both of the synthesis-target three-dimensional model and the synthesis three-dimensional model (step S401). For example, the control unit 210 obtains feature points which have a high corner intensity and a high stereo matching consistency among the feature points of the synthesis-target three-dimensional model (or the synthesis three-dimensional model). Alternatively, in consideration of the epipolar constraint between the pair images, the control unit 210 may perform matching based on a SURF (Speeded-Up Robust Features) quantity to obtain a feature point. Moreover, when the synthesis-target three-dimensional model (or the synthesis three-dimensional model) is generated through the above-explained three-dimensional model generating process (FIG. 5), the candidates of a feature point extracted in the step S201 may be obtained from the synthesis-target three-dimensional model (or the synthesis three-dimensional model).

Figure 8:
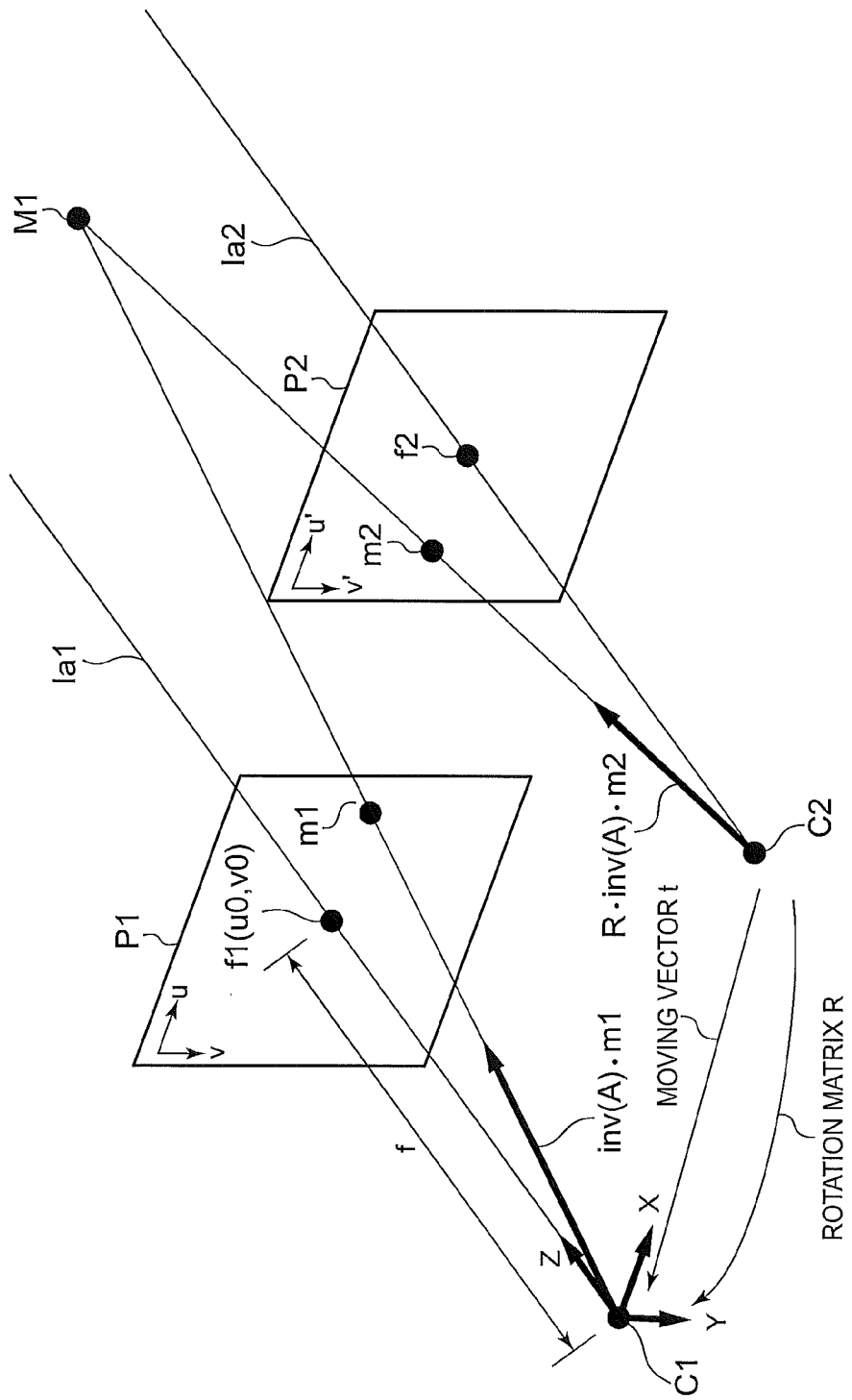
FIG. 8 is a diagram showing a perspective projection models by a first image-pickup unit and a second image-pickup unit.

Next, the control unit 210 classifies each feature point obtained from the synthesis-target three-dimensional model into two sets (performs clustering to create two clusters) based on a distance from the stereoscopic camera 1 (step S402). FIG. 8 shows perspective projection models of the first and second image-pickup units 100A and 100B. In this figure, the distance between the feature point and the stereoscopic camera 1 can be expressed as a coordinate value in a Z-axis direction of a coordinate system wherein a point C1 that is the lens principal point of the first image-pickup unit 100A set to the origin. For example, a discriminant analysis method can be applied to the clustering. The discriminant analysis performs clustering so that the dispersion between the two clusters becomes maximum. By performing clustering based on a distance (a Z coordinate) with the stereoscopic camera 1, a cluster configured by feature points corresponding to the object close to the stereoscopic camera 1 and a cluster configured by feature points corresponding to a background distant from the stereoscopic camera 1 are generated. Clustering may be performed through the other methods such as the nearest neighbor method, the furthest neighbor method, and group average method.

Returning to FIG. 7, next, the control unit 210 likewise classifies each obtained feature point candidate of the synthesis three-dimensional model into two sets (performs clustering to create two clusters) based on a distance (a Z coordinate in FIG. 8) with the stereoscopic camera 1 (step S403).

Subsequently, the control unit 210 selects, as feature points to be used for calculating the camera position (the coordinate transformation parameter) to be discussed later, only the feature points belonging to the cluster with a closer distance to the stereoscopic camera 1 between the two clusters having undergone respectively clustering through the processes in the step S402 and in the step S403 (step S404). The feature-point selecting process now ends. Feature points close to the camera are preferentially selected as feature points to be used for the later process through the feature-point selecting process.

Returning to FIG. 6, when completing the feature-point selecting process (step S301), the control unit 210 selects three feature points from the feature points of the synthesis-target three-dimensional model selected through the feature-point selecting process (step S302). The selected three feature points satisfy the following conditions (A) and (B). The condition (A) is that the area of a triangle having the three feature points as vertices is not too small, and the condition (B) is that the triangle having the three feature points as vertices does not have an extraordinary keen angle. For example, the control unit 210 keeps selecting three feature points at random until the three feature points satisfying the conditions (A) and (B) are selected. Determination on whether or not the conditions (A) and (B) are satisfied can be carried out by comparing the area of a triangle or the angle thereof with a predetermined threshold.

Next, the control unit 210 searches, for a triangle congruent with the triangle having the three feature points selected in the step S302 as vertices, triangles having feature points of the synthesis three-dimensional model selected through the feature-point selecting process (step S301) as three vertices (step S303). For example, when individual lengths of the three sides of respective triangles are substantially equal, it is determined that the two triangles are congruent. The process in the step S303 can be deemed as a process of selecting three feature points which may correspond to the three feature points selected from the synthesis-target three-dimensional model in the step S302 from the feature points of the synthesis three-dimensional model. The control unit 210 may speed up the searching by narrowing down the range of the candidates of the triangle in advance based on, for example, color information of a feature point or neighborhood of the feature point, or a SURF quantity. Information indicating the searched triangle (typically, information indicating coordinates of three feature points that are vertices of the triangle on the three-dimensional space) is stored in, for example, the memory unit 250. When there is a plurality of congruent triangles, pieces of information indicating all triangles are stored in the memory unit 250.

Subsequently, the control unit 210 determines whether or not at least a congruent triangle has been found in the searching in the step S303 (step S304). When too many congruent triangles are found, the control unit 210 may determine that no congruent triangle has been found.

When determining that at least one congruent triangle has been found (step S304: YES), the control unit 210 selects a congruent triangle (step S305). Conversely, when determining that no congruent triangle has been found (step S304: NO), the control unit 210 returns the process to the step S302.

When completing the process in the step S305, the control unit 210 executes a coordinate-transformation-parameter obtaining process (step S306). The coordinate-transformation-parameter obtaining process will be explained in detail with reference to the flowchart of FIG. 9. The coordinate-transformation-parameter obtaining process is to obtain a coordinate transformation parameter for transforming the coordinates of the synthesis three-dimensional model into the coordinates in the coordinate system of the synthesis-target three-dimensional model. The coordinate-transformation-parameter obtaining process is executed for each combination of the three feature points selected in the step S302 and the congruent triangle selected in the step S303.

The coordinate transformation parameter includes a rotation matrix R and a moving vector t satisfying a formula (3) relative to a corresponding-point pair (feature-point pair, vertex pair) given by formulae (1) and (2). In the formulae (1) and (2), point "$p_i$" and point "$p'_i$" are coordinate in the three-dimensional space as viewed from respective camera visual lines. Note that N is a number of pairs of the corresponding-point pairs.

$$p_i = \begin{bmatrix} x_i \\ y_i \\ z_i \end{bmatrix} (i=1, 2, \ldots, N) \quad (1)$$

$$p'_i = \begin{bmatrix} x'_i \\ y'_i \\ z'_i \end{bmatrix} (i=1, 2, \ldots, N) \quad (2)$$

$$p_i = R p'_i + t \quad (3)$$

In order to obtain the coordinate transformation parameter, the control unit 210 firstly sets a corresponding-point pair as is indicated by formulae (4) and (5) (step S501). In the formulae (4) and (5), $p_1$ to $p_N$ are feature points selected in the step S302 from the synthesis-target three-dimensional model, and p'1 to p'$_N$ are feature points selected in the step S303 from the synthesis three-dimensional model. Moreover, $p_1$ and $p'_1$, $p_2$ and $p'_2$, $p_N$ and $p'_N$ are coordinates of respective corresponding feature points. Note that c1 and c2 are matrixes where corresponding column vectors have coordinates of corresponding points.

It is difficult to directly obtain the rotation matrix R and the moving vector t from those matrixes. However, since respective distributions of p and p' are substantially consistent, corresponding points can be superimposed with each other by rotation after centroids of the corresponding points are superimposed. The rotation matrix R and the moving vector t are obtained through such a procedure.

$$c1 = [p_1 \, p_2 \ldots p_N] \quad (4)$$

$$c2 = [p'_1 \, p'_2 \ldots p'_N] \quad (5)$$

That is, the control unit 210 obtains a centroid t1 and a centroid t2 of the feature points using formulae (6) and (7) (step S502).

$$t1 = \frac{1}{N} \sum_{i=1}^{N} p_i \quad (6)$$

$$t2 = \frac{1}{N} \sum_{i=1}^{N} p'_i \quad (7)$$

Next, the control unit 210 obtains distributions d1 and d2 that are distributions (relative positions to respective centroids) of the feature points using formulae (8) and (9) (step S503). As explained above, there is a relationship indicated by a formula (10) between the distribution d1 and the distribution d2.

$$d1 = [(p_1 - t1)(p_2 - t1) \ldots (p_N - t1)] \quad (8)$$

$$d2 = [(p'_1 - t2)(p'_2 - t2) \ldots (p'_N - t2)] \quad (9)$$

$$d1 = R d2 \quad (10)$$

Next, the control unit 210 executes singular value decomposition on the distributions d1 and d2 using formulae (11) and (12) (step S504). It is presumed that singular values are arranged in the descending order. A symbol * indicates a complex conjugate transpose.

$$d1 = U_1 S_1 V_1^* \quad (11)$$

$$d2 = U_2 S_2 V_2^* \quad (12)$$

The control unit 210 determines whether or not the distributions d1 and d2 having undergone singular value decomposition in the step S504 are equal to or greater than two dimensional (i.e., a plane or a solid). When both of the vectors $(p_1-t1), (p_2-t1), \ldots, (p_N-t1)$, etc., contained in d1 and the vectors $(p'_1-t2), (p'_2-t2), \ldots, (p'_N-t2)$, etc., contained in d2 are not on a straight line, it is determined that such distributions are equal to or greater than two dimensional. When such dimensions are not equal to or greater than two dimensional, it is difficult to obtain the rotation matrix R, and the coordinate-transformation-parameter obtaining process for present c1 and c2 is terminated as an error. The singular value corresponds to how the distribution becomes widespread. Hence, the determination on whether or not the distribution is equal to or greater than two dimensional can be made based on a ratio between the maximum singular value and the other singular values or the magnitude of the singular value. For example, it is determined that the distribution is equal to or greater than two dimensional when the second largest singular value is equal to or greater than a predetermined value and a ratio with the maximum singular value is within a predetermined range.

Next, the control unit 210 obtains an association K (step S505). The rotation matrix R can be expressed as a formula (13) based on formulae (10) to (12). When the association K is defined as a formula (14), the rotation matrix R can be expressed as a formula (15).

$$R = U_1 S_1 V_1 * V_2 S_2^{-1} U_2 * \quad (13)$$

$$K = S_1 V_1 * V_2 S_2^{-1} \quad (14)$$

$$R = U_1 K U_2 * \quad (15)$$

Matrixes $U_1$ and $U_2$ indicate respective eigenvectors to the distributions d1 and d2. $U_1$ and $U_2$ are associated with each other by the association K. The association K is a matrix of 3×3. An element of the association K is 1 or −1 when respective eigenvectors indicated by $U_1$ and $U_2$ associated with that element correspond to each other, and is 0 in other cases.

Since the congruent triangle is selected in the step S305, the distributions d1 and d2 are substantially equal. Hence, singular values can be also deemed as equal. That is, S1 and S2 are consistent. In practice, the distributions d1 and d2 contain errors, and such errors are rounded as below. In consideration of those facts, each element ($k_{ij}$, where i and j are 1 to 3) of the association K is obtained from a formula (16). That is, the control unit 210 calculates in step S505 the association K using the formula (16). Note that $r_i V_1*$ means an $i^{th}$ column of a matrix $V_1*$, and $c_j V_2$ indicates a $j^{th}$ row of a matrix $V_2$. Moreover, round (x) is a function that places back the closest integer to x.

$$k_{ij} = \text{round}\{r_i V_1 * \cdot c_j V_2\} \quad (16)$$

Subsequently, the control unit 210 calculates the rotation matrix R (step S506). More specifically, the control unit 210 calculates the rotation matrix R based on the formulae (15) and (16). Information indicating the rotation matrix R obtained through the calculation is stored in, for example, the memory unit 250.

Next, the control unit 210 calculates the moving vector t (step S507), and the coordinate-transformation-parameter obtaining process completes.

With respect to the rotation matrix R calculated at this stage, $p_i$ and $p'_i$, satisfy a formula (17). When the formula (17) is transformed, a formula (18) can be obtained. Based on the correspondence between the formula (18) and the formula (3), the moving vector t can be expressed as a formula (19).

$$(p_i - t1) = R(p'_i - t2) \quad (17)$$

$$p_i = R p'_i + (t1 - Rt2) \quad (18)$$

$$t = t1 - Rt2 \quad (19)$$

When the distributions d1 and d2 are two-dimensional (i.e., the distributions are planar), a part of the association K may be broken. More specifically, the element of the association K at the third column and the third row is either 1 or −1, but when the distribution is two-dimensional, a correct sign cannot be derived from the formula (16) in some cases. Hence, the control unit 210 verifies the rotation matrix through a process, such as checking of a cross product relation of the rotation matrix R or recalculation through the formula (10), and executes a process of correcting the association when the association is improper. Checking of the cross product relation means checking of whether or not the column vector (and the row vector) of the rotation matrix R satisfy a restriction of the coordinate system. For example, in a right-hand coordinate system, the restriction of the coordinate system is satisfied when the cross product of the first-column vector and the second-column vector is equal to the third-column vector. Upon verification of the rotation matrix R, when the association is improper, the control unit 210 corrects the association K. More specifically, the sign of the element of the association K at the third column and the third row is inverted. Next, the rotation matrix R is calculated again using the corrected K, and the moving vector t is calculated using the rotation matrix calculated again.

Returning to FIG. 6, when the coordinate-transformation-parameter obtaining process (step S306) completes, the control unit 210 orients the coordinate systems using the obtained coordinate transformation parameter (step S307). More specifically, the coordinates of the feature point of the synthesis three-dimensional model is transformed into the coordinates in the coordinate system of the synthesis-target three-dimensional model using the formula (3).

Next, the control unit 210 stores the feature-point pair (step S308). The feature-point pair includes the feature point of the synthesis-target three-dimensional model and the feature point having a distance from the feature point of the synthesis-target three-dimensional model equal to or smaller than a predetermined value and closest to that point among the feature points of the synthesis three-dimensional model having undergone the coordinate transformation. The selection of the three feature points in the step S302 and the selection of the congruent triangle in the step S305 are estimated as more appropriate when the number of feature-point pairs increases. The feature-point pair can be stored in the memory unit 250, etc., together with the selection of the three feature points in the coordinate-transformation-parameter obtaining condition (step S302) and the selection of the congruent triangle in the step S305.

Subsequently, the control unit 210 determines whether or not all congruent triangles found in the step S303 has been selected in the step S305 (step S309).

When determining that any of the congruent triangles has not been selected yet (step S309: NO), the control unit 210 returns the process to the step S305.

Conversely, when determining that all congruent triangles have been selected (step S309: YES), the control unit 210 determines whether or not a termination condition is satisfied (step S310). In this embodiment, the termination condition is satisfied when the coordinate transformation parameters for equal to or greater than predetermined number of conditions are obtained or a predetermined number of process loops are carried out.

When determining that the termination condition is not satisfied (step S310: NO), the control unit 210 returns the process to the step S302.

Conversely, when determining that the termination condition is satisfied (step S310: YES), the control unit 210 specifies the most appropriate coordinate transformation parameter (step S311). More specifically, the coordinate transformation parameter (the rotation matrix R and the moving vector t) that permits acquisition of the largest number of feature-point pairs is set as the most appropriate coordinate transformation parameter. In other words, the coordinate transformation parameter calculated in the process loop where the selection of the three feature points in the step S302 and the selection of the congruent triangle in the step S305 are most appropriate is specified as most appropriate.

In the step S311, the coordinate transformation parameter that makes the average distance of the feature-point pair smallest may be specified as most appropriate.

Figure 9:
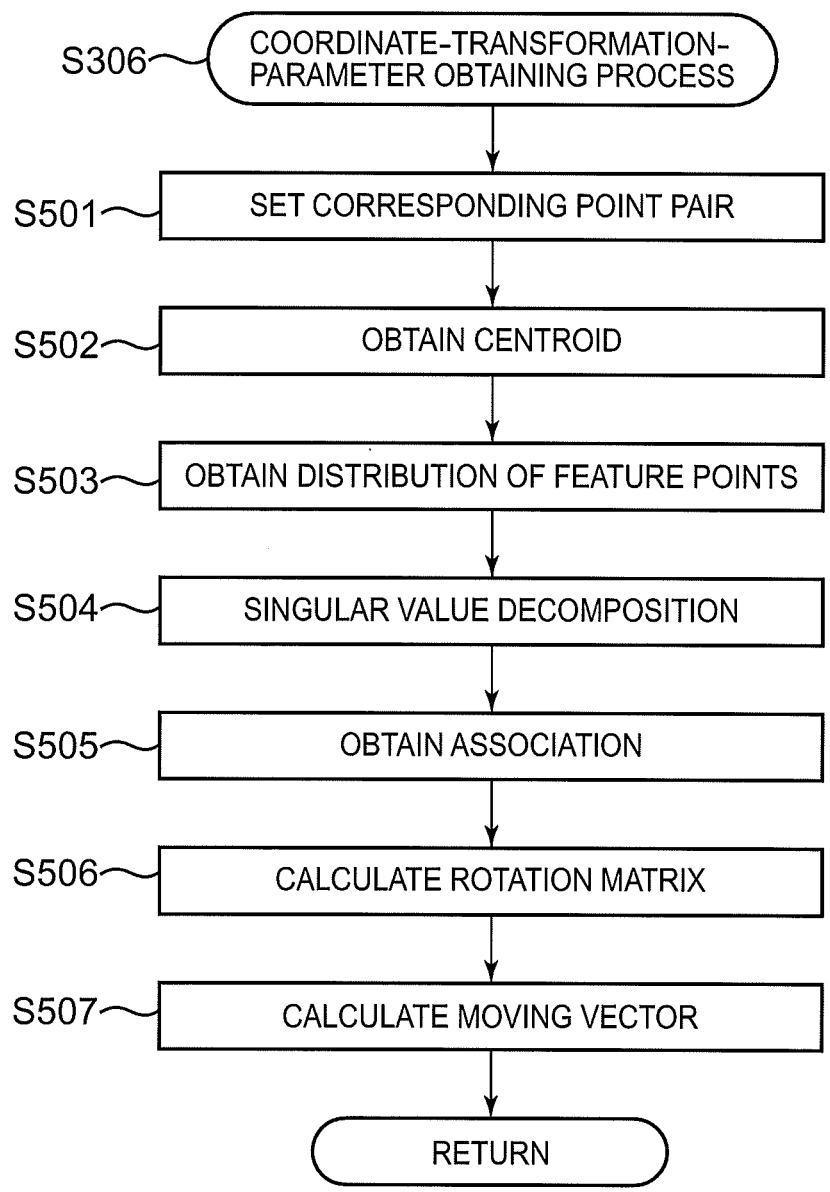
FIG. 9 is a flowchart showing a coordinate-transformation-parameter obtaining process shown in FIG. 6.

Moreover, in the step S311, the rotation matrix R and the moving vector t are calculated again using the plurality of feature-point pairs (most appropriate pairs) obtained based on the specified most appropriate coordinate transformation parameter. That is, the coordinate-transformation-parameter obtaining process shown in FIG. 9 is executes with the plurality of most appropriate pairs being as corresponding pairs to calculate again the rotation matrix R and the moving vector t. The rotation matrix R and the moving vector t calculated again at this step are used as the coordinate transformation parameter in the following processes.

Thereafter, the control unit 210 terminates the camera position estimating process.

Figure 10:
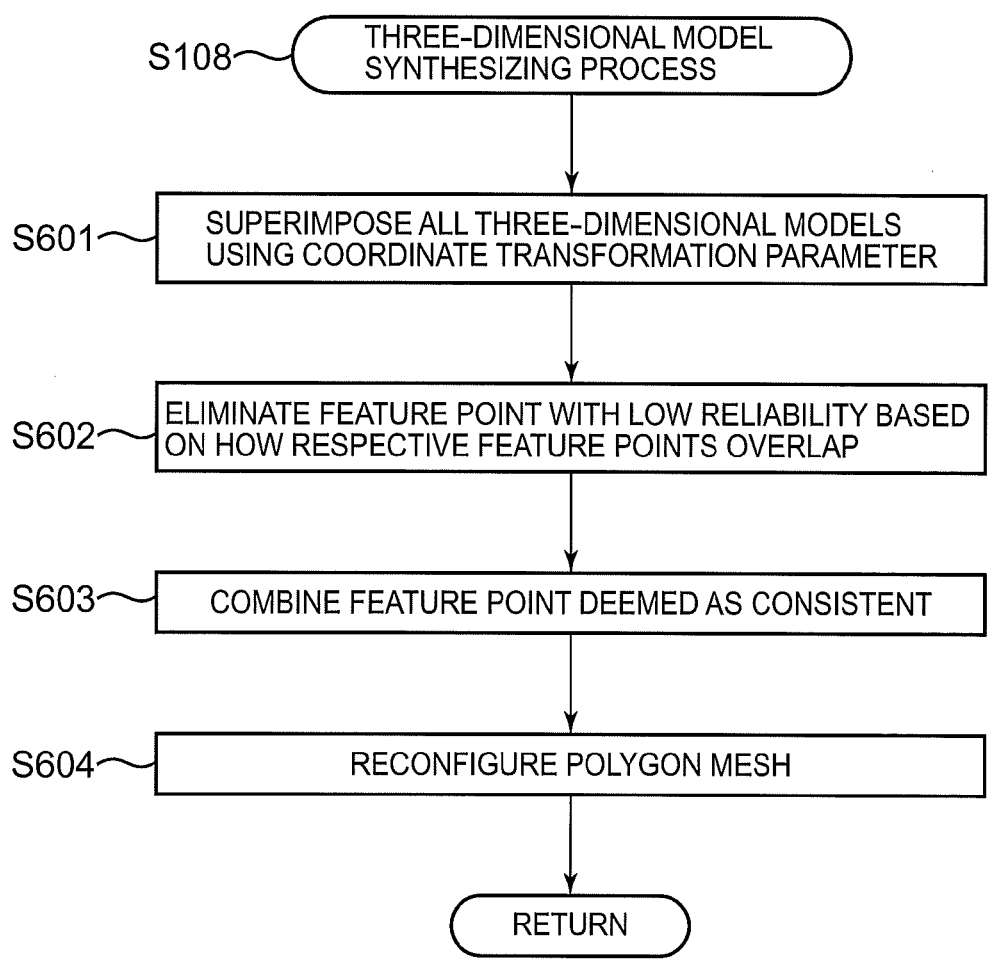
FIG. 10 is a flowchart showing a three-dimensional model synthesizing process shown in FIG. 4.

Returning to FIG. 4, when the camera position estimating process (step S107) completes, the control unit 210 executes a three-dimensional model synthesizing process (step S108). The three-dimensional model synthesizing process will be explained with reference to the flowchart of FIG. 10.

First, the control unit 210 superimposes all three-dimensional models using the coordinate transformation parameter specified through the camera position estimating process in the step S107 (step S601). For example, in the case of the second image-pickup, the synthesis three-dimensional model having undergone coordinate transformation and generated based on the pair images picked up at the second time is superimposed on the synthesis-target three-dimensional model generated based on the pair images picked up at the first time. Moreover, in the case of the third image-pickup, the synthesis three-dimensional model having undergone coordinate transformation and generated based on the pair images picked up by the second time is superimposed on the synthesis-target three-dimensional model generated based on the pair images picked up at the first time, and the synthesis three-dimensional model having undergone coordinate transformation and generated based on the pair images picked up at the third time is further superimposed thereon.

Next, the control unit 210 obtains the reliability of each feature point based on how respective feature points overlap, and eliminates the feature point with a low reliability (step S602). For example, a Mahalanobis' generalized distance of a focused feature point of a three-dimensional model based on the distribution of the closest feature points of another three-dimensional model relative to that focused feature point is calculated, and when the Mahalanobis' generalized distance is equal to or greater than a predetermined value, it is determined that the reliability of the focused feature point is low. The feature point having a distance from the focused feature point equal to or greater than a predetermined value may be excluded from the closest feature points. When the number of closest feature points is small, it can be determined that the reliability is low. The process of eliminating the feature point in practice is executed after it is determined for all feature points whether or not to eliminate.

Subsequently, the control unit 210 combines the feature points which can be deemed as consistent (step S603). For example, the feature points within a predetermined distance are all taken as belonging to a group representing the same feature point, and a centroid of those feature points is set as a new feature point.

Next, the control unit 210 reconfigures a polygon mesh (step S604). That is, a polygon (a three-dimensional model) is generated with the new feature point obtained in the step S603 being as a vertex. The three-dimensional model synthesizing process completes through the above-explained steps.

Information (typically, coordinate information of the feature point) indicating the three-dimensional model generated by the three-dimensional model generating process (step S104) is held by what corresponds to all image-pickup (all visual lines) while the shutter button 331 is being depressed, and is basically unchanged. That is, the three-dimensional model synthesizing process (step S108) is to separately generate a high-definition three-dimensional model for displaying or for storing based on the three-dimensional models by what corresponds to all image-pickup.

Returning to FIG. 4, when the three-dimensional model synthesizing process (step S108) completes, the control unit 210 increments the value of the image-pickup time counter N by 1 (step S109).

Subsequently, the control unit 210 displays a three-dimensional model after synthesis (step S110). More specifically, the control unit 210 displays the three-dimensional model obtained in the three-dimensional model synthesizing process (step S108) to the display 310. Hence, the user can know how much precise the three-dimensional model currently generated is up to the present image-pickup.

Next, the control unit 210 determines whether or not the shutter button 331 is released (step S111). When determining that the shutter button 331 is released (step S111: YES), the control unit 210 stores the three-dimensional model after the synthesis in, for example, the external memory unit 260 (step S112), and completes the three-dimensional modeling process. Conversely, when determining that the shutter button 331 is not released (step S111: NO), the control unit 210 returns the process to the step S103.

As explained above, according to the stereoscopic camera 1 of the first embodiment, a plurality of three-dimensional models are synthesized, enabling high-definition three-dimensional modeling, in which shape information is highly conserved. Moreover, according to the stereoscopic camera 1 of the first embodiment, feature points expected as having a low reliability are eliminated, and feature points which can be deemed as consistent are combined to perform three-dimensional modeling, enabling appropriate three-dimensional modeling. Furthermore, the stereoscopic camera 1 of this embodiment does not employ a configuration of simultaneously picking up images of an object at various angles, and thus the stereoscopic camera 1 can be downsized. The user can know how much precise the three-dimensional model currently generated is by viewing a polygon displayed on the display 310. This gives an opportunity for the user to determine whether or not three-dimensional modeling is sufficiently performed, or from another angle the image-pickup must be carried out in order to perform sufficient three-dimensional modeling.

According to the stereoscopic camera 1 of this embodiment, while a camera position (a coordinate transformation parameter) is calculated from the feature point of each three-dimensional model, calculation is made using the feature point close to the stereoscopic camera 1 preferentially. In general, the closer the feature point of the three-dimensional model is to the stereoscopic camera 1, the better such a feature point corresponds to a point on the object, and the precision of the position information becomes high. Hence, the more precise camera position can be calculated by giving a preference to the feature point close to the stereoscopic camera 1, thereby enabling high-definition three-dimensional modeling.

<Second Embodiment>

According to the first embodiment, a three-dimensional model is generated using the stereoscopic camera 1 having the two image-pickup units. However, the present invention can be applied to a monocular camera 2 having only one image-pickup unit. An explanation will be given of a three-dimensional modeling process of generating a three-dimensional model using the monocular camera 2 with reference to FIGS. 11 and 12.

Figure 11:
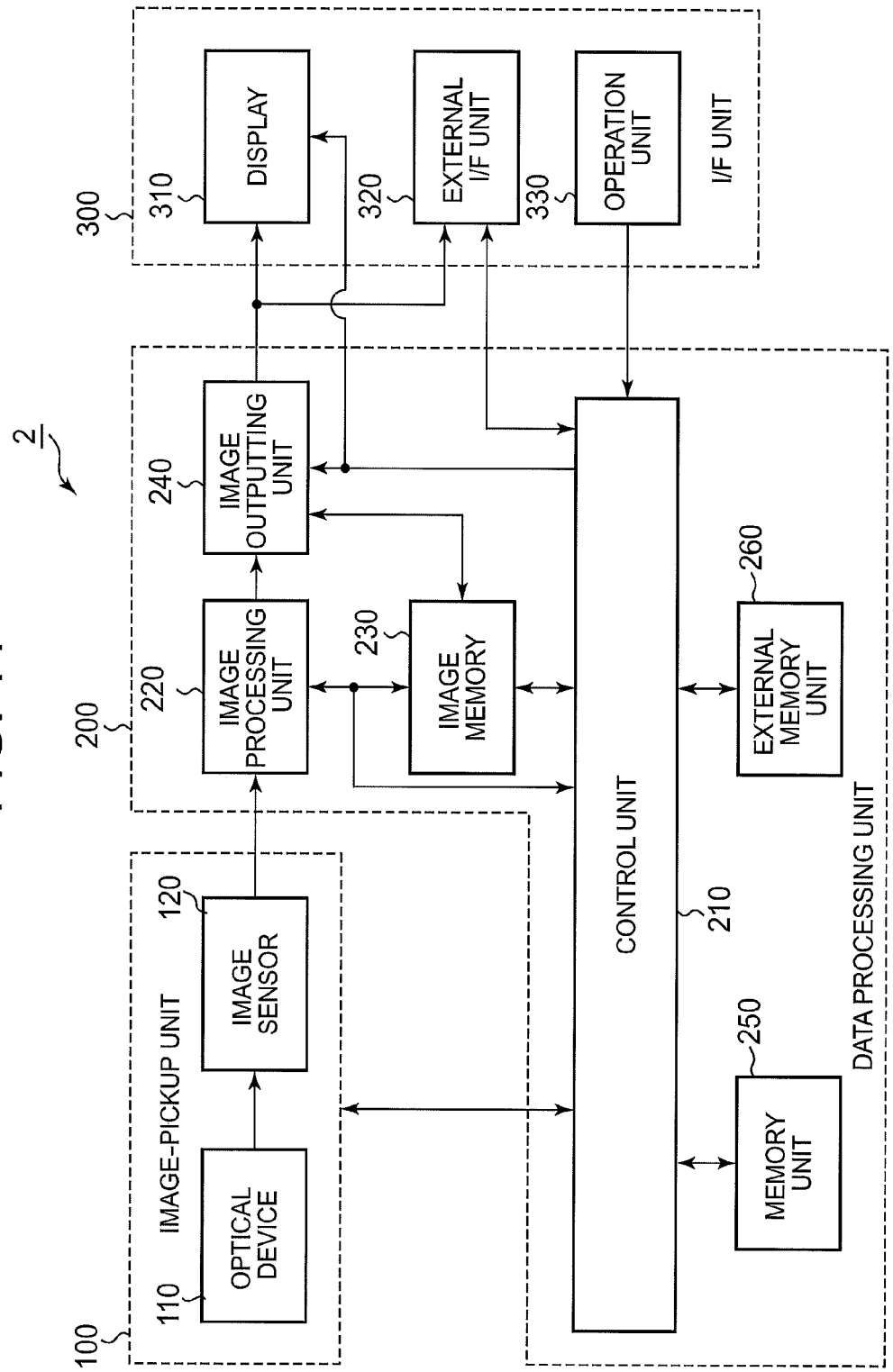
FIG. 11 is a diagram showing a configuration of a monocular camera according to a second embodiment of the present invention.

FIG. 11 is a block diagram showing an electrical configuration of the monocular camera 2. The stereoscopic camera 1 has the two image-pickup units that are the first and second image-pickup units 100A and 100B, but the monocular camera 2 has only one image-pickup unit 100. The image-pickup unit 100 includes an optical device 110 and an image sensor 120. The other configurations of the monocular camera 2 are consistent with those of the stereoscopic camera 1, which will be denoted by the same reference numerals, and the duplicated explanation thereof will be omitted.

Next, with reference to the flowchart of FIG. 12, an explanation will be given of the three-dimensional modeling process executed by the monocular camera 2. When the operation mode is set to be the three-dimensional modeling mode by operation to the operation key 332, etc., the monocular camera 2 starts executing the three-dimensional modeling process shown in FIG. 12.

When the three-dimensional modeling process starts, first, the control unit 210 controls the image-pickup unit 100 to obtain (pick up) an image (hereinafter, referred to as a first image) of an object (step S701). The obtained image is stored in, for example, the image memory 230.

When the process in the step S701 completes, a user moves the monocular camera 2 to a different image-pickup position from the image-pickup position where the first image is picked up. Next, after a predetermined time has elapsed, or in response to a predetermined instruction operation by the user, the control unit 210 of the monocular camera 2 controls the image-pickup unit 100 likewise the step S701 to obtain (pick up) an image (hereinafter, referred to as a second image) of the object (step S702). The obtained image is stored in, for example, the image memory 230.

Subsequently, the control unit 210 obtains a point (a corresponding point) that associates a feature point on the first image with a feature point on the second image representing the same point on the object (step S703). More specifically, the control unit 210 applies the Harris corner detection method to the first and second images like the step S201 of the three-dimensional model generating process (see FIG. 5) of the first embodiment, thereby obtaining a feature point (hereinafter, referred to as a first feature point) on the first image and a feature point (hereinafter, referred to as a second feature point) on the second image. Next, template matching is performed on an image area (a feature point neighboring area) within a predetermined distance from a feature point between the first and second feature points. Then select the pair of the first and the second feature points of which a matching level calculated for the first and second feature points in the template matching is equal to or greater than a predetermined threshold and highest in every possible pair, and the feature points of the selected pair are associated with each other and taken as corresponding points, respectively. Alternatively, by performing matching based on a SURF feature quantity, a corresponding point may be obtained.

Next, the control unit 210 obtains a basic matrix E that can be expressed as the following formula (20) from the obtained association of the feature points (step S704). In the formula (20), t is a moving vector and R is a rotation matrix. "t" and "R" are the coordinate transformation parameter for transforming the image coordinate system of the second image into the image coordinate system of the first image. Moreover, a symbol x represents a cross product.

$$E = t \times R \quad (20)$$

More specifically, the control unit 210 calculates a focal distance between the principal point of the image-pickup unit 100 and the focal point thereof at the time of picking up the first image based on the lens driving condition of the image-pickup unit 100. Next, the control unit 210 can calculate the basic matrix E through an eight-point algorithm, a seven-point algorithm, or a five-point algorithm using the image position of each feature point and the focal distance thereof.

Next, the control unit 210 decomposes the basic matrix E to obtain the moving vector t and the rotation matrix R (step S705). More specifically, the control unit 210 calculates the eigenvector of a matrix "trans (E)·E" with the minimum eigen value as the moving vector t. Note that "trans" is a symbol representing a transposition of the matrix. Subsequently, the control unit 210 calculates the rotation matrix R through least squares, etc., so that an error between, (i) a cross product of the rotation matrix R to be calculated and the already calculated moving vector t, and (ii) the already calculated basic matrix E becomes minimum as is indicated in a formula (21). In the formula (21), a symbol Σ indicates a sum of all elements of the matrix, and a symbol ⇒ min indicates the minimization of the left side value.

$$\Sigma(t \times R - E)^2 \Rightarrow \min \quad (21)$$

Subsequently, the control unit 210 obtains respective projection matrixes (camera projection parameters) of the first and second images to a camera coordinate system (step S706). When a projection matrix (the camera projection parameter) of the first image to the camera coordinate system is P, P can be expressed as an inner product of a camera internal parameter A indicating the status of the interior of the camera and a camera external parameter [R|t.] indicating the position of the camera as a formula (22). Moreover, the camera internal parameter A can be expressed as a formula (23) based on a focal distance f of the camera and a position on an image corresponding to an optical axis (u0, v0), etc.

$$P = A \cdot \begin{pmatrix} R11 & R12 & R13 & t1 \\ R21 & R22 & R23 & t2 \\ R31 & R32 & R33 & t3 \end{pmatrix} \quad (22)$$

$$A = \begin{pmatrix} f & 0 & u0 \\ 0 & f & v0 \\ 0 & 0 & 1 \end{pmatrix} \quad (23)$$

Since the camera projection parameter with reference to the image-pickup position of the first image is obtained, the moving vector t and the rotation matrix R indicate that no coordinate transformation is performed. Hence, the formula (22) can be expressed as a formula (24), and the projection matrix (the camera projection parameter) P of the first image to the camera coordinate system can be obtained by solving the formula (24).

$$P = A \cdot \begin{pmatrix} 1 & 0 & 0 & 0 \\ 0 & 1 & 0 & 0 \\ 0 & 0 & 1 & 0 \end{pmatrix} \quad (24)$$

Moreover, a projection matrix (the camera projection parameter) P' of the second image to the camera coordinate system can be obtained as a formula (25) using the moving vector t and the rotation matrix R obtained in the step S705. Note that a symbol | indicates a coupling of matrixes.

$$P' = A \cdot [R|t] \quad (25)$$

Next, the control unit 210 obtains three-dimensional information of each feature point using, the moving vector t, the rotation matrix R obtained in the step S705, the camera projection parameters P and P' obtained in the step S706 (step S707). In other words, this process is to obtain coordinates (X, Y, Z) of each feature point in a world coordinate system of which origin is set to the image-pickup potion of the monocular camera 2 at the time of picking up the first image.

For example, it is presumed that the position of the feature point on the first image is (u, v), and the position of the feature point corresponding to the former feature point on the second image is (u', v'). In this case, the three-dimensional information (coordinates (X, Y, Z) in the world coordinate system) of each feature point satisfies formulae (26) and (27). Accordingly, the world coordinates (X, Y, Z) can be obtained from the formula (26) and the formula (27) through a least squares method or the like. This calculation is performed on all pairs of corresponding feature points specified in the step S703.

$$\text{trans}(u,v,1) \sim P \cdot \text{trans}(X,Y,Z,1) \quad (26)$$

$$\text{trans}(u',v',1) \sim P' \cdot \text{trans}(X,Y,Z,1) \quad (27)$$

Note that a symbol ~ indicates that both sides are equal to each other, while permitted a difference by a constant multiplication.

Subsequently, the control unit 210 classifies respective feature points having pieces of three-dimensional information obtained in this manner into two sets (performs clustering to create two clusters) based on a distance (a Z coordinate in the world coordinate system) with the monocular camera 2 (step S708). For example, discriminant analysis can be applied to the clustering.

Next, the control unit 210 selects the feature point configuring the cluster closer to the monocular camera 2 between the two clusters having undergone clustering (step S709).

Thereafter, the control unit 210 reobtains the basic matrix E using only the feature point selected in the step S709 (step S710), and reobtains the moving vector t and the rotation matrix R from the obtained basic matrix E (step S711). The control unit 210 reobtains the projection matrix (the camera projection parameter) using the formula (25) from the reobtained moving vector t and rotation matrix R (step S712). The processes from the step S710 to the step S712 are substantially same as the processes from the step S704 to the step S706 except that the feature point used (selected) differs.

Next, the control unit 210 obtains three-dimensional information of each feature point using the moving vector t and the rotation matrix R obtained in the step S711 and the camera projection parameters P and P' obtained in the step S712 (step S713). In this step, pieces of three-dimensional information are obtained for all feature points obtained in the step S703, not only for the feature point selected in the step S709.

Subsequently, the control unit 210 executes Delaunay triangulation based on the three-dimensional information of each feature point obtained in the step S713, and executes polygonization (step S714). Generated polygon information is stored in, for example, the memory unit 250. Upon completion of the process in the step S714, the three-dimensional model generating process by the monocular camera 2 completes.

As explained above, according to the monocular camera 2 of the second embodiment, a plurality of feature points are obtained from respective images picked up at different positions. And a camera position is estimated based on the obtained feature points, and three-dimensional information of the feature point is calculated based on the estimated camera position. Next, the camera position is estimated again preferentially using the feature point closer to the monocular camera 2 among the obtained feature points, and three-dimensional information of the feature point is calculated again from the re-estimated camera position, thereby generating a three-dimensional model based on the three-dimensional information of the feature point re-calculated. In general, the closer the feature point is to the monocular camera 2, the better such a feature point corresponds to a point on the object, and the positional precision becomes high. Hence, it becomes possible to calculate a more precise camera position by giving a preference to the feature point close to the monocular camera 2, enabling high-definition three-dimensional modeling.

<Modified Examples>

The present invention is not limited to the above-explained embodiments, and can be changed and modified in various forms without departing from the scope and spirit of the present invention.

Figure 7:
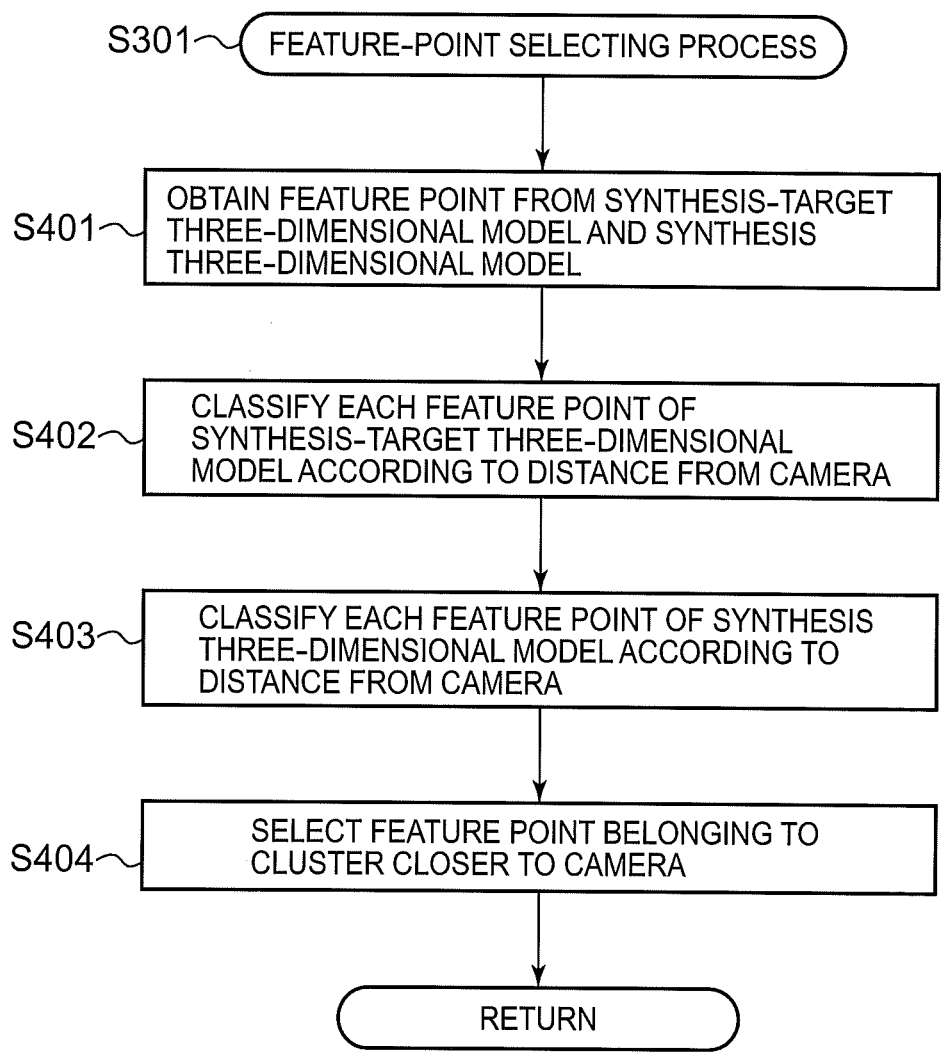
FIG. 7 is a flowchart showing a feature-point selecting process shown in FIG. 6.

For example, according to the first embodiment, in the feature-point selecting process shown in FIG. 7, the feature point is obtained in the step S401, and from the feature points obtained in the steps S402 and S403, two clusters are created based on a distance from the stereoscopic camera 1. The feature point belonging to the closer cluster to the stereoscopic camera 1 is selected in the step S404 as the feature point used for three-dimensional modeling.

However, a feature point not having undergone clustering and having a distance from the stereoscopic camera 1 within a predetermined threshold may be selected as the feature point used for three-dimensional modeling. Moreover, any robust method such as RANSAC (RANdom SAmple Consensus) method may be applied to each feature point having a distance from the stereoscopic camera 1 within the predetermined threshold to find a feature point to be selected. Furthermore, a feature point in a predetermined upper percentage of the feature points obtained in the step S401 and having a closer distance to the stereoscopic camera 1 may be selected. Any robust estimation techniques like RANSAC method using a predetermined evaluation formula such that a closer feature point to the stereoscopic camera 1 has a higher evaluation value may be applied to the feature points obtained in the step S401 to select an estimated feature point. In conclusion, the closer feature point to the stereoscopic camera 1 is preferentially selected among all feature points.

Figure 12:
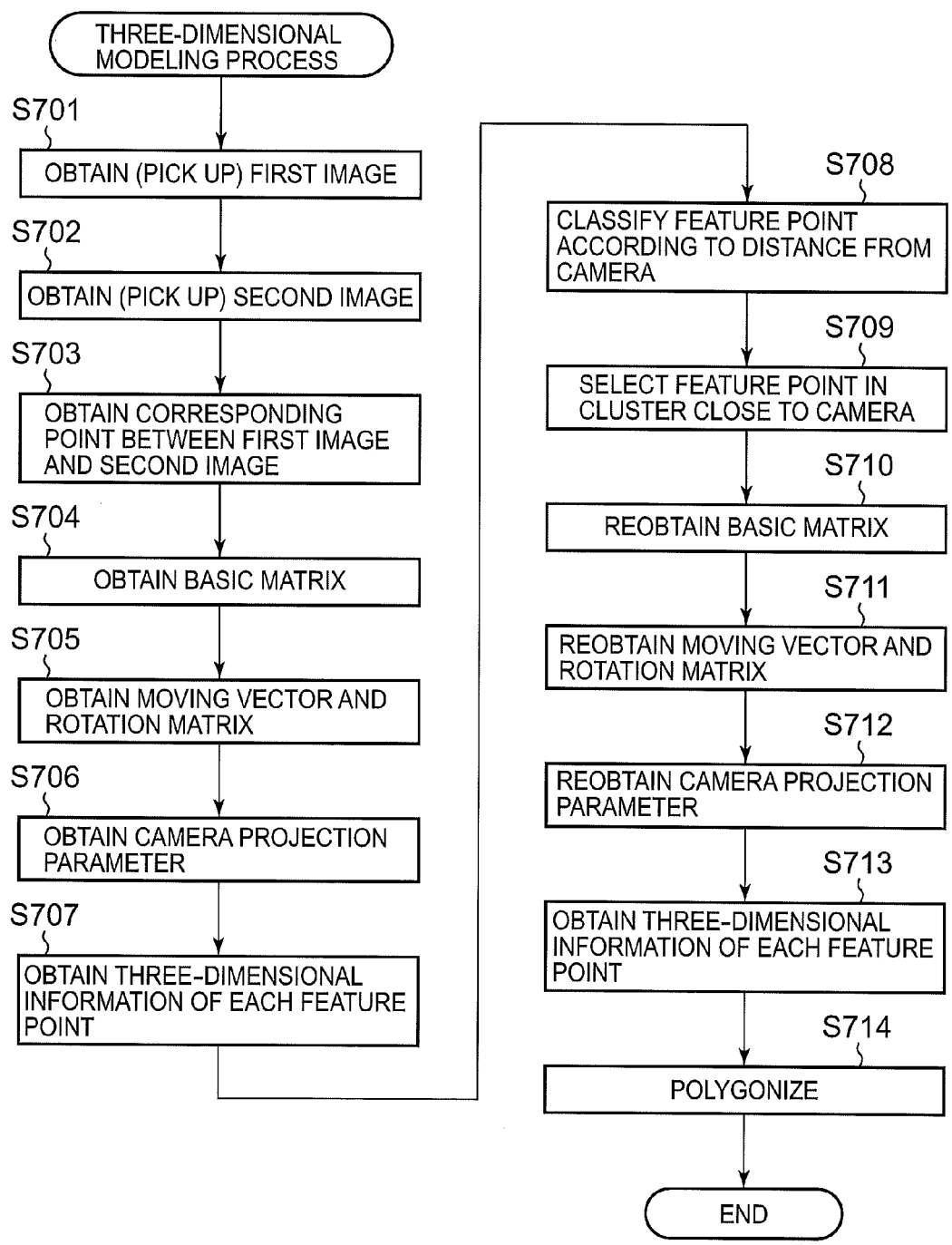
FIG. 12 is a flowchart showing a three-dimensional modeling process executed by the monocular camera of the second embodiment.

According to the second embodiment, in the three-dimensional modeling process shown in FIG. 12, the feature points are subjected to clustering in the step S708. Next, the feature point belonging to the closer cluster to the monocular camera 2 is selected in the step S709 as the feature point used for three-dimensional modeling. However, a feature point no having undergone clustering and having a distance from the monocular camera 2 within a predetermined threshold may be selected as the feature point used for three-dimensional modeling. Moreover, any robust techniques like RANSAC method may be applied to each feature point having a distance from the monocular camera 2 within the predetermined threshold to find a feature point to be selected. Furthermore, a feature point in a predetermined upper percentage of the feature points obtained in the step S703 and having a closer distance to the monocular camera 2 may be selected. Any robust techniques like RANSAC method using a predetermined evaluation formula such that a closer feature point to the monocular camera 2 has a higher evaluation value may be applied to the feature points obtained in the step S703 to select a feature point. In conclusion, the closer feature point to the monocular camera 2 is preferentially selected among all feature points.

Existing stereoscopic cameras and monocular cameras, etc., can function as the three-dimensional modeling device of the present invention. That is, the program executed by the control unit 210 is applied to an existing stereoscopic camera or a monocular camera, etc., and the CPU, etc., of such stereoscopic camera or monocular camera is caused to run the program, thereby functioning the stereoscopic camera or the monocular camera, etc., as the three-dimensional modeling device of the present invention.

How to distribute such a program is optional, and for example, the program stored in a computer-readable recording medium, such as a CD-ROM (Compact Disk Read-Only Memory), a DVD (Digital Versatile Disk), an MO (Magneto Optical disk), or a memory card, may be distributed. Alternatively, the program can be distributed over a communication network like the Internet.

In this case, when the above-explained functions of the present invention are borne by an OS (Operating System) and an application program or are embodied by the cooperation of the OS and the application program, only the application program portion may be stored in a recording medium, etc.

Although several embodiments of the present invention were explained above, the equivalence to the invention set forth in the appended claims should be within the scope and spirit of the present invention.

Having described and illustrated the principles of this application by reference to one or more preferred embodiments, it should be apparent that the preferred embodiments may be modified in arrangement and detail without departing from the principles disclosed herein and that it is intended that the application be construed as including all such modifications and variations insofar as they come within the spirit and scope of the subject matter disclosed herein.

What is claimed is:

1. A three-dimensional modeling apparatus comprising:
   an image obtaining section that obtains image sets picked up by a stereoscopic camera;
   a generating section that generates three-dimensional models of an object based on each of the obtained image sets;
   a three-dimensional model selecting section that selects a first three-dimensional model and a second three-dimensional model to be superimposed on the first three-dimensional model among the generated three-dimensional models;
   an extracting section which extracts first feature points from the selected first three-dimensional model and second feature points from the selected second three-dimensional model;
   a feature-point selecting section that selects feature points having a closer distance to the stereoscopic camera from the extracted first feature points and the extracted second feature points, respectively;
   a parameter obtaining section that obtains a transformation parameter for transforming a coordinate of the second three-dimensional model into a coordinate in a coordinate system of the first three-dimensional model based on the selected first and second feature points;
   a transforming section that transforms the coordinate of the second three-dimensional model into the coordinate in the coordinate system of the first three-dimensional model using the transformation parameter; and
   a superimposing section that superimposes the second three-dimensional model having a transformed coordinate on the first three-dimensional model,
   wherein the feature-point selecting section (i) performs clustering on the extracted first and second feature points to create two clusters based on a distance from the stereoscopic camera, and (ii) selects the first feature point and the second feature point belonging to respective clusters having the closer distance to the stereoscopic camera.

2. The three-dimensional modeling apparatus according to claim 1, wherein the feature-point selecting section (i) applies a robust estimation technique, which uses a predetermined evaluation formula so that the closer a distance to the stereoscopic camera is, the higher an evaluation value becomes, to the extracted first and second feature points, and (ii) selects an estimated feature point.

3. A three-dimensional modeling apparatus comprising:
   an obtaining section that obtains a first image and a second image obtained by imaging an object at different positions;
   an extracting section which extracts first feature points on the first image and second feature points on the second image corresponding to the first feature points, respectively;
   a selecting section that selects a combination of feature points having a closer distance to a camera at a time of imaging among the first feature points and the second feature points corresponding to the first feature points;
   a parameter obtaining section that obtains a transformation parameter indicating a positional relationship of a position at which the first image is imaged and a position at which the second image is imaged based on the selected combination of the first and second feature points;
   an information obtaining section that obtains pieces of three-dimensional information of the first feature points and the second feature points extracted by the extracting section based on the transformation parameter; and
   a generating section that generates a three-dimensional model based on the three-dimensional information,
   wherein the selecting section (i) performs clustering on the extracted first and second feature points to create two clusters based on a distance from the camera at the time of imaging, and (ii) selects the combination of feature points belonging to respective clusters having the closer distance to the camera at the time of imaging.

4. A three-dimensional modeling method comprising:
   obtaining image sets picked up by a stereoscopic camera;
   generating three-dimensional models of an object based on each of the obtained image sets;
   selecting a first three-dimensional model and a second three-dimensional model to be superimposed on the first three-dimensional model among the generated three-dimensional models;
   extracting first feature points from the selected first three-dimensional model and second feature points from the selected second three-dimensional model;

selecting feature points having a closer distance to the stereoscopic camera from the extracted first feature points and the extracted second feature points, respectively;

obtaining a transformation parameter for transforming a coordinate of the second three-dimensional model into a coordinate in a coordinate system of the first three-dimensional model based on the selected first and second feature points;

transforming the coordinate of the second three-dimensional model into the coordinate in the coordinate system of the first three-dimensional model using the transformation parameter; and superimposing the second three-dimensional model having a transformed coordinate on the first three-dimensional model, wherein selecting the feature points having the closer distance to the stereoscopic camera comprises:

clustering the extracted first and second feature points to create two clusters based on a distance from the stereoscopic camera; and selecting the first feature point and the second feature point belonging to respective clusters having the closer distance to the stereoscopic camera.

5. A three-dimensional modeling method comprising:

obtaining a first image and a second image obtained by imaging an object at different positions;

extracting first feature points on the first image and second feature points on the second image corresponding to the first feature points, respectively;

selecting a combination of feature points having a closer distance to a camera at a time of imaging among the first feature points and the second feature points corresponding to the first feature points;

obtaining a transformation parameter indicating a positional relationship of a position at which the first image is imaged and a position at which the second image is imaged based on the selected combination of the first and second feature points;

obtaining pieces of three-dimensional information of the extracted first feature points and the extracted second feature points based on the transformation parameter; and generating a three-dimensional model based on the three-dimensional information, wherein selecting the combination of feature points having the closer distance to the camera at the time of imaging comprises:

clustering the extracted first and second feature points to create two clusters based on a distance from the camera at the time of imaging; and selecting the combination of feature points belonging to respective clusters having the closer distance to the camera at the time of imaging.

6. A non-transitory computer-readable recording medium having stored therein a program executable by a computer, the program causing the computer to realize functions of:

obtaining image sets picked up by a stereoscopic camera;

generating three-dimensional models of an object based on each of the obtained image sets;

selecting a first three-dimensional model and a second three-dimensional model to be superimposed on the first three-dimensional model among the generated three-dimensional models;

extracting first feature points from the selected first three-dimensional model and second feature points from the selected second three-dimensional model;

selecting feature points having a closer distance to the stereoscopic camera from the extracted first feature points and the extracted second feature points, respectively;

obtaining a transformation parameter for transforming a coordinate of the second three-dimensional model into a coordinate in a coordinate system of the first three-dimensional model based on the selected first and second feature points;

transforming the coordinate of the second three-dimensional model into the coordinate in the coordinate system of the first three-dimensional model using the transformation parameter; and superimposing the second three-dimensional model having a transformed coordinate on the first three-dimensional model, wherein selecting the feature points having the closer distance to the stereoscopic camera comprises:

clustering the extracted first and second feature points to create two clusters based on a distance from the stereoscopic camera; and selecting the first feature point and the second feature point belonging to respective clusters having the closer distance to the stereoscopic camera.

7. A non-transitory computer-readable recording medium having stored therein a program executable by a computer, the program causing the computer to realize functions of:

obtaining a first image and a second image obtained by imaging an object at different positions;

extracting first feature points on the first image and second feature points on the second image corresponding to the first feature points, respectively;

selecting a combination of feature points having a closer distance to a camera at a time of imaging among the first feature points and the second feature points corresponding to the first feature points;

obtaining a transformation parameter indicating a positional relationship of a position at which the first image is imaged and a position at which the second image is imaged based on the selected combination of the first and second feature points;

obtaining pieces of three-dimensional information of the extracted first feature points and the extracted second feature points based on the transformation parameter; and generating a three-dimensional model based on the three-dimensional information, wherein selecting the combination of feature points having the closer distance to the camera at the time of imaging comprises:

clustering the extracted first and second feature points to create two clusters based on a distance from the camera at the time of imaging; and selecting the combination of feature points belonging to respective clusters having the closer distance to the camera at the time of imaging.

* * * * *

UNITED STATES PATENT AND TRADEMARK OFFICE
CERTIFICATE OF CORRECTION

PATENT NO. : 8,928,736 B2
APPLICATION NO. : 13/440909
DATED : January 6, 2015
INVENTOR(S) : Mitsuyasu Nakajima et al.

It is certified that error appears in the above-identified patent and that said Letters Patent is hereby corrected as shown below:

On the title page:

Item (30) Foreign Application Priority Data;

delete "Jun 4, 2011" and insert --April 6, 2011--.

Signed and Sealed this
Thirtieth Day of June, 2015

Michelle K. Lee
*Director of the United States Patent and Trademark Office*